United States Patent
Wu

(10) Patent No.: US 12,343,628 B2
(45) Date of Patent: Jul. 1, 2025

(54) INFORMATION RECOMMENDATION METHOD AND APPARATUS, AND ELECTRONIC DEVICE

(71) Applicant: Tencent Technology (Shenzhen) Company Limited, Shenzhen (CN)

(72) Inventor: Yue Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 644 days.

(21) Appl. No.: 17/724,367

(22) Filed: Apr. 19, 2022

(65) Prior Publication Data
US 2022/0233958 A1    Jul. 28, 2022

Related U.S. Application Data

(63) Continuation of application No. PCT/CN2021/095454, filed on May 24, 2021.

(30) Foreign Application Priority Data

Jun. 17, 2020 (CN) .......................... 202010552942.6

(51) Int. Cl.
*A63F 13/533* (2014.01)
*A63F 13/58* (2014.01)
(Continued)

(52) U.S. Cl.
CPC ............ *A63F 13/533* (2014.09); *A63F 13/58* (2014.09); *A63F 13/85* (2014.09); *G06F 9/453* (2018.02);
(Continued)

(58) Field of Classification Search
CPC .... G06F 16/904; G06F 16/9035; G06F 9/453; A63F 13/533; A63F 13/58; A63F 13/85; A63F 2300/401; H04L 9/50
See application file for complete search history.

(56) References Cited

U.S. PATENT DOCUMENTS 7,363,370 B2 * 4/2008 Collazo ............... H04L 41/0233
709/224
11,445,254 B2 * 9/2022 Larson ............... H04N 21/4667
(Continued)

FOREIGN PATENT DOCUMENTS

CN   102156706 A   8/2011
CN   102622210 A   8/2012
(Continued)

OTHER PUBLICATIONS

360 Mobile Games, "Strengthening Function: I Want to Become Stronger", Feb. 17, 2017, 2 pgs., Retrieved from the Internet: https://u.360.cn/gl/article/224068/.
(Continued)

*Primary Examiner* — Tadesse Hailu
(74) *Attorney, Agent, or Firm* — Morgan, Lewis & Bockius LLP

(57) ABSTRACT

This application provides an information recommendation method, an electronic device, and a computer readable storage medium. The method includes: in response to receiving a recommendation instruction in an application for a target account: displaying, on a display interface of the application, a gap in operation capability data of the application between the target account and a second account; and displaying guidance content corresponding to operation capability data of the target account. The guidance content is used to improve the operation capability data of the target account.

19 Claims, 13 Drawing Sheets

(51) Int. Cl.
*A63F 13/85* (2014.01)
*G06F 9/451* (2018.01)
*G06F 16/9035* (2019.01)
*G06F 16/904* (2019.01)
*H04L 9/00* (2022.01)

(52) U.S. Cl.
CPC ........ *G06F 16/9035* (2019.01); *G06F 16/904* (2019.01); *H04L 9/50* (2022.05); *A63F 2300/401* (2013.01)

(56) References Cited

U.S. PATENT DOCUMENTS

| | | | | |
|---|---|---|---|---|
| 2008/0228868 | A1* | 9/2008 | Sivakoff | G09B 7/02 434/350 |
| 2016/0307172 | A1* | 10/2016 | He | G06Q 40/02 |
| 2017/0318061 | A1* | 11/2017 | Zha | G06F 16/9537 |
| 2018/0068313 | A1* | 3/2018 | Van Os | G06Q 20/3674 |
| 2018/0165746 | A1* | 6/2018 | Huang | G06F 16/9038 |
| 2019/0260854 | A1* | 8/2019 | Sun | H04L 12/2818 |
| 2020/0090250 | A1* | 3/2020 | Anderson | G06F 16/9535 |
| 2020/0233873 | A1* | 7/2020 | Kamotsky | G06Q 30/0625 |
| 2020/0344202 | A1* | 10/2020 | Qian | H04L 61/4594 |
| 2020/0382637 | A1* | 12/2020 | Cranfill | G06F 21/604 |
| 2021/0110306 | A1* | 4/2021 | Krishnan | G06N 3/08 |

FOREIGN PATENT DOCUMENTS

| | | |
|---|---|---|
| CN | 107085803 A | 8/2017 |
| CN | 107362538 A | 11/2017 |
| CN | 108960992 A | 12/2018 |
| CN | 109903178 A | 6/2019 |
| CN | 111429171 A | 7/2020 |
| CN | 111708927 A | 9/2020 |
| JP | 2006158594 A | 6/2006 |
| JP | 2007014680 A | 1/2007 |
| KR | 20180075931 A | 7/2018 |

OTHER PUBLICATIONS

Tencent Technology, ISR, PCT/CN2021/095454, Aug. 24, 2021, 2 pgs.
Tencent Technology, Japanese Office Action, JP 2022-554610, Oct. 10, 2023, 12 pgs.
Tencent Technology, Japanese Office Action, JP Patent Application No. 2022-554610, Dec. 3, 2024, 7 pgs.
Tencent Technology, WO, PCT/CN2021/095454, Aug. 24, 2021, 4 pgs.
Tencent Technology, IPRP, PCT/CN2021/095454, Dec. 13, 2022, 5 pgs.
Tencent Technology, Korean Office Action, KR Patent Application No. 10-2022-7017667, Jan. 31, 2025, 11 pgs.

* cited by examiner

| Ratio interval | Text effect | Icon effect |
|---|---|---|
| 0–20% | To be urgently improved | |
| 21–50% | To be improved | |
| 51–90% | Acceptable | |
| 91–100% | Nearly perfect | |

FIG. 9

INFORMATION RECOMMENDATION METHOD AND APPARATUS, AND ELECTRONIC DEVICE

CROSS-REFERENCE TO RELATED APPLICATIONS

This application is a continuation application of PCT Patent Application No. PCT/CN2021/095454, entitled "INFORMATION RECOMMENDATION METHOD AND APPARATUS, AND ELECTRONIC DEVICE" filed on May 24, 2021, which claims priority to Chinese Patent Application No. 202010552942.6, filed with the State Intellectual Property Office of the People's Republic of China on Jun. 17, 2020, and entitled "INFORMATION RECOMMENDATION METHOD AND DEVICE AND ELECTRONIC EQUIPMENT", all of which are incorporated herein by reference in their entirety.

FIELD OF THE TECHNOLOGY

This application relates to information technologies, and in particular, to an information recommendation method and apparatus, an electronic device, and a computer readable storage medium.

BACKGROUND OF THE DISCLOSURE

An application refers to software compiled by using a programming language. A user may implement a function in an application by operating the application, for example, playing a game by using a game application, playing a movie by using a video and audio application, and creating a document by using an office application.

Some users may not be familiar with an operation mode of the application. In a solution provided by a related technology, operation capability data of an account in the application is generally compared with a preset value, and corresponding guidance content is displayed according to a comparison result. However, in this solution, it cannot be ensured that the displayed guidance content is actually required by the user, and information recommendation is of poor effectiveness and pertinence.

SUMMARY

Technical solutions in the embodiments of this application are implemented as follows:

An embodiment of this application provides an information recommendation method, including:

in response to receiving a recommendation instruction in an application for a target account: displaying, on a display interface of the application, a gap in operation capability data of the application between the target account and a second account; and displaying guidance content corresponding to operation capability data of the target account, wherein the guidance content is used to improve the operation capability data of the target account.

An embodiment of this application provides an information recommendation apparatus, including:

a display module, configured to: display, on a display interface of an application in response to a recommendation instruction for a target account in the application, a gap between the target account and another account in operation capability data in the application; and display guidance content corresponding to operation capability data of the target account;

the guidance content being used for guiding to improve the operation capability data of the target account.

An embodiment of this application provides an electronic device, including:

a memory, configured to store an executable instruction; and a processor, configured to implement the information recommendation method provided in the embodiments of this application when executing the executable instruction stored in the memory.

An embodiment of this application provides a computer readable storage medium that stores an executable instruction, when executed by a processor, causing the processor to implement the information recommendation method provided in the embodiments of this application.

BRIEF DESCRIPTION OF THE DRAWINGS

FIG. 9 is a schematic diagram of a ratio interval and a display effect according to an embodiment of this application.

DESCRIPTION OF EMBODIMENTS

Figure 1:
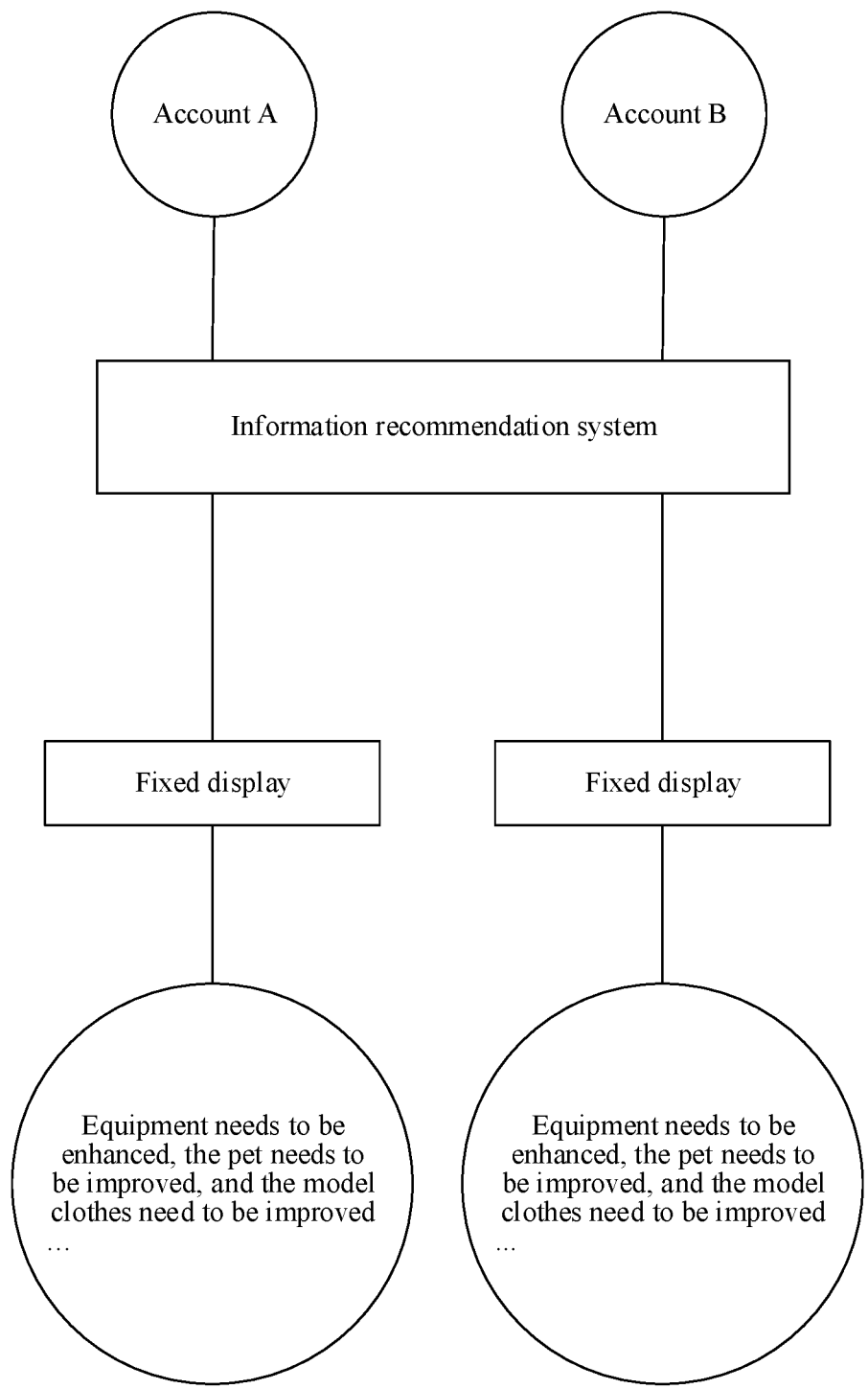
FIG. 1 is a schematic diagram of information recommendation according to a related technology.

To make objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict. In the following description, the term "plurality of" means at least two.

Unless otherwise defined, meanings of all technical and scientific terms used in this specification are the same as that usually understood by a person skilled in the art to which this application belongs. In this application, terms used in the specification of this application are merely intended to describe objectives of the specific embodiments, but are not intended to limit this application.

Before the embodiments of this application are further described in detail, a description is made on nouns and terms in the embodiments of this application, and the nouns and terms in the embodiments of this application are applicable to the following explanations.

(1) Application: is software compiled by using a programming language and can be classified into a plurality of types according to different functions implemented, such as a game application, a video and audio application, and an office application. According to different deployment environments, the software may be divided into a mobile APP, a computer application, and the like. The embodiments of this application set no limitation on an application for information recommendation.

(2) Target account: may be an account in a login state in an application or any specified account.

(3) Operation capability data: is data that reflects an operation capability of a user to operate an application by using an account. For different applications, operation capability data includes various indicator data related to a specific operation in the applications. For example, in a game application, operation capability data of an account may include at least one of a power, a combat capability, and an equipment attribute of a game role of the account. In an office application, operation capability data of an account may include a quantity of shortcut keys entered by a user when using an office function of the office application by using the account.

(4) Account data: indicates a natural attribute of an account in an application. The account data may include at least one of an account type and an account level. Using a game application as an example, a plurality of professions may be selected for a game role in the game application, such as fighter, mage, and marksman. Therefore, an account type of an account may include a profession of a game role of the account in the game application. An account level of an account may include a level of a game role of the account, or may include a very important person (VIP) level obtained by consumption by the account in the game application.

5) Blockchain: An encrypted chain transaction storage structure formed by blocks.

6) Blockchain network: A set of a series of nodes of a blockchain in which a new block is included through consensus.

An application is user-oriented software developed by using a programming language. A user registers and logs in to an account in the application, so as to use a function in the application. Some users may be unfamiliar with an operation mode in the application. In a solution provided by a related technology, operation capability data of an account is generally compared with a preset value, and all corresponding guidance content is displayed according to a comparison result. FIG. 1 is a schematic diagram of information recommendation according to a related technology. A game application is used as an example. For accounts (an account A and an account B shown in FIG. 1) in the game application, operation capability data of the accounts is transmitted to an information recommendation system, and the information recommendation system compares the operation capability data of the accounts with a plurality of preset values, and fixedly displays corresponding guidance content according to a comparison result. As shown in FIG. 1, guidance content associated with equipment, a pet, and model clothes is timely installed.

Figure 2:
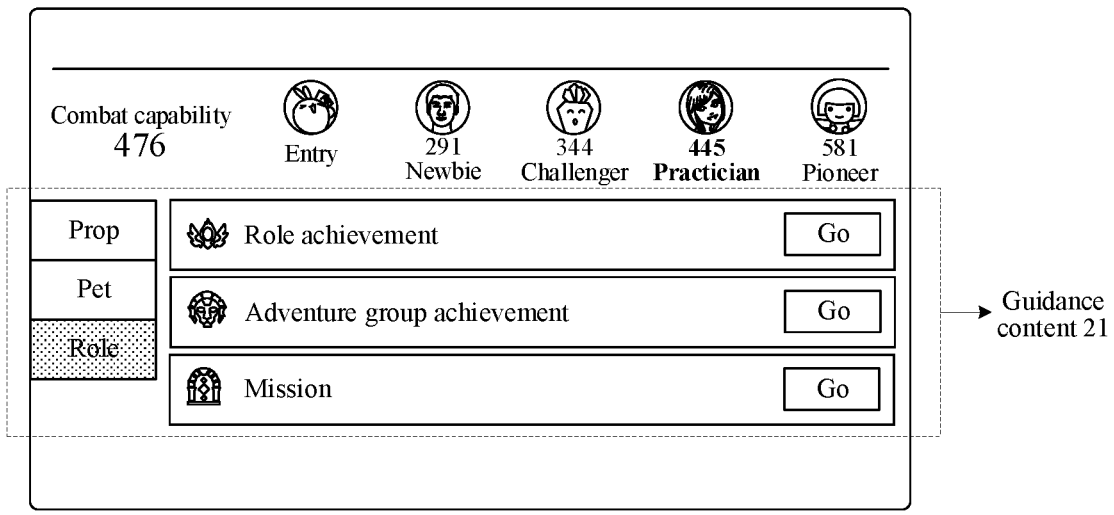
FIG. 2 is a schematic diagram of a display interface of an application according to a related technology.

FIG. 2 is a display interface used for displaying guidance content in a related technology. In FIG. 2, operation capability data of an account is a combat capability of a game role of the account. For the combat capability, a related person (for example, a background planner of the game application) may preset a plurality of values for comparison, for example, 291, 344, 445, and 581 shown in FIG. 2, and set a corresponding name and guidance content for each value. In FIG. 2, an acquired combat capability of the game role of the account is 476, which is greater than a preset value 445. Therefore, a name of the game role is displayed as a "practician", and all corresponding guidance content is displayed. In FIG. 2, guidance content 21 includes a first-level classification and a second-level classification. The first-level classification includes "prop", "pet", and "role", and each first-level classification includes a plurality of second-level classifications. FIG. 2 shows a second-level classification "role achievement", "adventure group achievement", and "mission" under a first-level classification "role".

According to FIG. 1 and FIG. 2, solutions provided by a related technology mainly have the following problems: (1) Information recommendation is of poor pertinence for different users, and front-end user experience is too general, resulting in poor user experience. (2) In the related technology, all determined guidance content is displayed on a display interface. If there are too many dimensions (types) of operation capability data, too much information is displayed on the front end, and a user cannot obtain effective information from the information, that is, information recommendation is of poor effectiveness, and dividing operation capability data into more dimensions cannot be supported. (3) A reference value of the guidance content depends on an understanding degree and maintenance time of manual maintenance. When an understanding degree is low or the maintenance is late, the reference value of the guidance content displayed is low, with only little help to assist a user in operating the application.

Embodiments of this application provide an information recommendation method and apparatus, an electronic device, and a computer readable storage medium, which can improve effectiveness and pertinence of information recommendation, and effectively assist a user in improving an operation capability for an application. The following describes an exemplary application of an electronic device provided in an embodiment of this application. The electronic device provided in this embodiment of this application may be implemented as various types of terminal devices such as a notebook computer, a tablet computer, a desktop computer, a set top box, a mobile device (for example, a mobile phone, a portable music player, a personal digital assistant, a dedicated messaging device, and a portable game device), or may be implemented as a server.

By running the information recommendation solution provided in this embodiment of this application, the electronic device can reach a gap and guidance content to a user, thereby improving an effect of assisting in operating an application, that is, improving auxiliary performance of the electronic device, which is applicable to a plurality of scenarios in which assisting in operating an application is required. For example, when using an office application, a user can quickly determine, according to a gap and guidance content displayed by an electronic device, whether the guidance content is actually required by the user according to the gap. For example, a larger gap indicates that the guidance content is more likely to be actually required by the user. In this way, the user can effectively improve operation capability data of a target account, that is, improve an operation capability of the user to the office application. In another example, when playing a game by using a game application, a user can accurately select guidance content by using a gap and guidance content displayed by an electronic device, so as to improve operation capability data of a game role, such as a combat capability, and effectively reduce a combat capability gap between the game role and that of another account.

Figure 3:
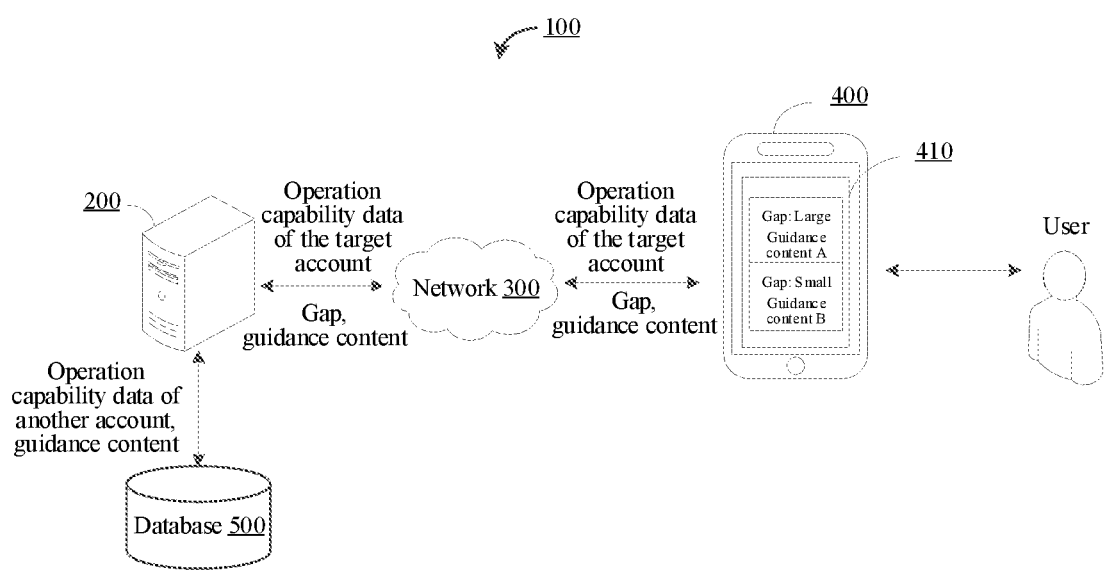
FIG. 3 is a schematic architecture diagram of an information recommendation system according to an embodiment of this application.

Referring to FIG. 3, FIG. 3 is a schematic architecture diagram of an information recommendation system 100 according to an embodiment of this application. To support an information recommendation application, a terminal device 400 connects to a server 200 by using a network 300, and the server 200 connects to a database 500. The network 300 may be a wide area network, a local area network, or a combination of the wide area network and the local area network. A database is a data set that is stored together in a manner, can be shared with a plurality of users, has as little redundancy as possible, and is independent of an application program. A user can add, query, update, and delete data in the database.

In some embodiments, the terminal device 400 may perform the information recommendation method provided in the embodiments of this application. For example, an application is installed in the terminal device 400. In a running process of the application, the terminal device 400 acquires operation capability data of a target account in response to a recommendation instruction for the target account in the application, and determines a gap between the target account and another account in operation capability data. Then, the terminal device 400 determines, in a plurality of pieces of guidance content, guidance content corresponding to the operation capability data of the target account, and displays the gap and the determined guidance content on a display interface of the application, where the display interface is displayed on a graphical interface 410. In addition, the terminal device 400 may further determine, in a plurality of pieces of introduction content, introduction content corresponding to the operation capability data of the target account, and display the introduction content on the display interface. Operation capability data of the second account may be locally stored in the terminal device 400 in advance, or may be acquired by the terminal device 400 externally (for example, a distributed file system of the server 200, the database 500, or a blockchain network), and guidance content and introduction content are the same.

In some embodiments, the terminal device 400 may also be combined with the server 200, so as to collaboratively perform the information recommendation method provided in the embodiments of this application. For example, an application is installed in the terminal device 400. In a running process of the application, the terminal device 400 acquires operation capability data of a target account in response to a recommendation instruction for the target account in the application, and determines a gap between the target account and another account in operation capability data. The server 200 may transmit operation capability data of the second account to the terminal device 400, so that the terminal device 400 locally compares the operation capability data of the target account with the operation capability data of the second account to obtain a gap. The terminal device 400 may alternatively transmit the operation capability data of the target account to the server 200, and the server 200 calculates the gap between the target account and the second account in operation capability data, and transmits the gap to the terminal device 400. Herein, the server 200 may acquire the operation capability data of the second account from the database 500, or certainly may acquire the operation capability data of the second account from a distributed file system of the server 200 or a blockchain network. Herein, only the database 500 is used as an example for description. The terminal device 400 may transmit the operation capability data of the target account to the server 200. The server 200 acquires a plurality of pieces of preset guidance content from the database 500 or another data storage location, determines the guidance content corresponding to the operation capability data of the target account therefrom, and transmits the determined guidance content to the terminal device 400. In addition, the server 200 may alternatively acquire a plurality of pieces of preset introduction content from the database 500 or another data storage location, determine the introduction content corresponding to the operation capability data of the target account therefrom, and transmit the determined introduction content to the terminal device 400, so as to be displayed on the display interface of the application.

Information recommended logic in this embodiment of this application may be integrated into a function add-in, for example, an internal intelligent robot program of the application, and the intelligent robot program responds to a recommendation instruction for the target account in the application, so as to perform a related operation of information recommendation.

The terminal device 400 may display various intermediate results in an information recommendation process on the graphical interface 410, for example, the operation capability data of the target account, the operation capability data of the second account, the gap, the guidance content, and the introduction content. In FIG. 3, for example, a gap and guidance content A corresponding to operation capability data in a dimension, and a gap and guidance content B corresponding to operation capability data in another dimension are shown. Because the larger the gap is, the corresponding guidance content is more likely to be actually required by the user. Therefore, when displaying, guidance content corresponding to a larger gap may be displayed at a more important location, for example, displayed in front, so as to improve an effect of information recommendation.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The cloud service may be an information recommendation service, which is invoked by the terminal device 400 to process the operation capability data of the target account transmitted by the terminal device 400, and transmit the obtained gap and guidance content to the terminal device 400. The terminal device 400 may be a smartphone, a tablet computer, a notebook computer, a desktop computer, a smart speaker, a smart watch, or the like, but is not limited thereto. The terminal device and the server may be directly or indirectly connected in a wired or wireless communication manner. This is not limited in the embodiments of this application.

Figure 4:
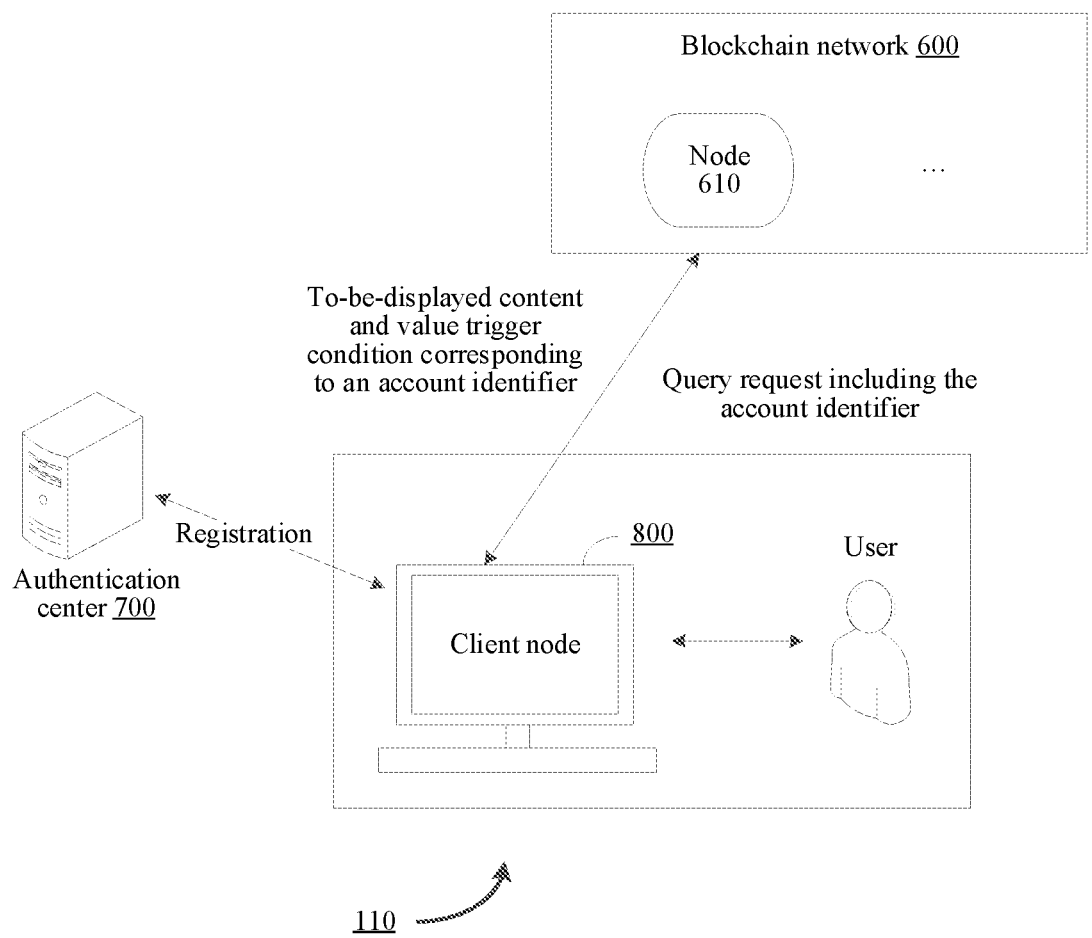
FIG. 4 is a schematic architecture diagram of an information recommendation system combined with a blockchain network according to an embodiment of this application.

Referring to FIG. 4, FIG. 4 is a schematic architecture diagram of an information recommendation system 110 combined with a blockchain network according to an embodiment of this application. The information recommendation system 110 includes a blockchain network 600 (the blockchain network 600 includes a plurality of nodes, and FIG. 4 exemplarily shows a node 610), an authentication center 700, and an electronic device 800. The electronic device 800 may be a server (for example, the server 200 shown in FIG. 3), or may be a terminal device (for example, the terminal device 400 shown in FIG. 3), depending on an actual application scenario. The authentication center 700 is configured to deliver a digital certificate to the electronic device 800.

A type of the blockchain network 600 is flexible and may be, for example, any one of a public chain, a private chain, or a consortium chain. Using a public blockchain as an example, any electronic device such as a terminal device and a server may access the blockchain network 600 without authorization. Using a consortium blockchain as an example, the electronic device may access the blockchain network 600 after obtaining authorization. In this case, the electronic device becomes a special node in the blockchain network 600, that is, a client node. The client node may provide only a capability to initiate a transaction (e.g., to store data or query data on a blockchain), and the client node may implement by default or selectively (e.g., depending on specific service requirements) a function of a native node of the blockchain network 600, such as a sorting function, a consensus service, and a bookkeeping function. Therefore, data and service processing logic of the electronic device may be migrated to the blockchain network 600 to a maximum extent, and a trusted and traceable data and service processing process is implemented by using the blockchain network 600. The blockchain network 600 receives a transaction submitted by the client node, and perform the transaction to update or query a ledger.

The electronic device 800 may access the blockchain network 600 to become a client node of the blockchain network 600, thereby implementing a function of storing data or querying data on a blockchain, which is described in detail later. This embodiment of this application imposes no limitation on a type of data in a blockchain, for example, which may include to-be-displayed content and a value trigger condition.

Figure 5:
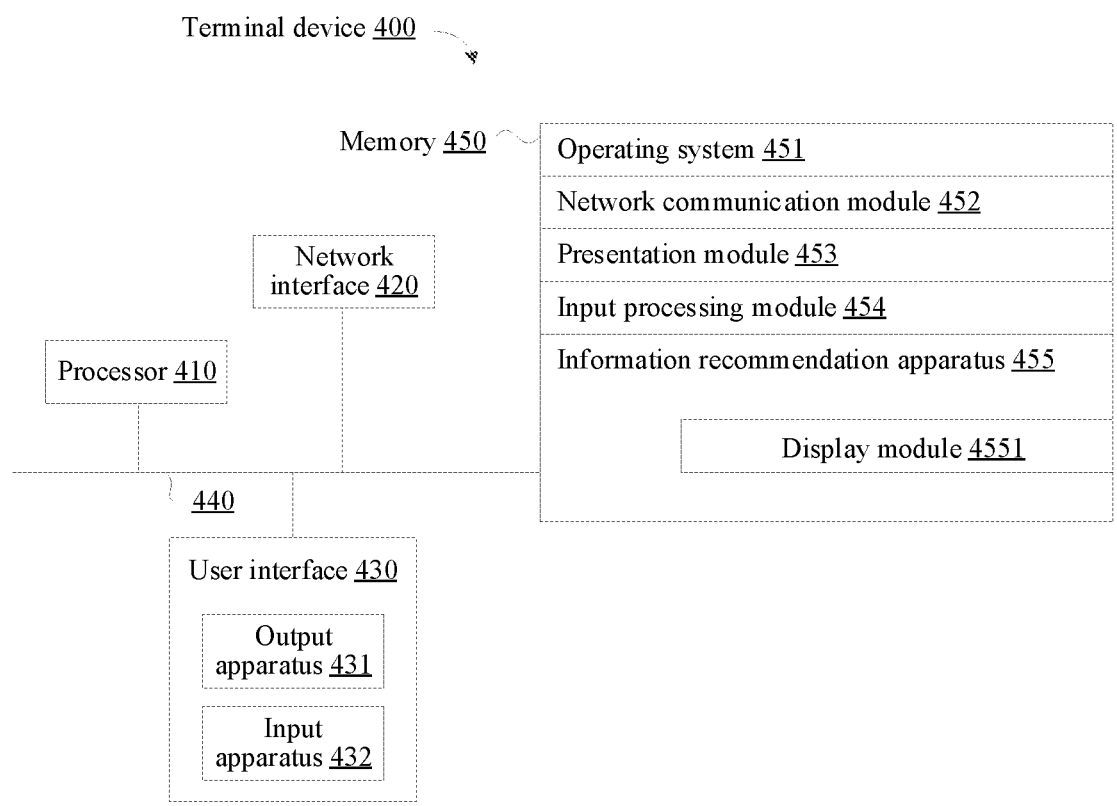
FIG. 5 is a schematic architecture diagram of a terminal device according to an embodiment of this application.

Referring to FIG. 5, FIG. 5 is a schematic structural diagram of a terminal device 400 according to an embodiment of this application. The terminal device 400 shown in FIG. 5 includes at least one processor 410, a memory 450, at least one network interface 420, and a user interface 430. All the components in the terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 5.

The processor 410 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 430 includes one or more output apparatuses 431 that enable presentation of media content, including one or more speakers and/or one or more visual displays. The user interface 430 further includes one or more input apparatuses 432, including a user interface component that facilitates user input, such as a keyboard, a mouse, a microphone, a touchscreen display, a camera, another input button, and a control.

The memory 450 may be removable, non-removable, or a combination thereof. Exemplary hardware devices include a solid-state memory, a hard disk drive, an optical disc driver, or the like. The memory 450 may include, in some embodiments, one or more storage devices that are physically away from the processor 410.

The memory 450 may include a volatile memory or a non-volatile memory, or may include a volatile memory and a non-volatile memory. The non-volatile memory may be a read-only memory (ROM), and the volatile memory may be a random access memory (RAM). The memory 450 described in this embodiment of this application is to include any other suitable type of memories.

In some embodiments, the memory 450 can store data to support various operations, and examples of the data include programs, modules, and data structures, or subsets or supersets thereof, as illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another electronic device through one or more (wired or wireless) network interfaces 420. Exemplary network interfaces 420 include: Bluetooth, wireless compatible authentication (WiFi), a universal serial bus (USB), and the like.

A presentation module 453 is configured to present information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the information recommendation apparatus provided in this embodiment of this application may be implemented in a software manner. FIG. 5 shows an information recommendation apparatus 455 stored in the memory 450. The information recommendation apparatus 455 may be software in a form of a program, an add-in, or the like, including a display module 4551, and a software module in the information recommendation apparatus 455 is logically implemented. Therefore, any combination or further division may be performed according to an implemented function. The function of the module is described below.

The information recommendation method provided in the embodiments of this application may be performed by the foregoing terminal device (for example, may be the terminal device 400 shown in FIG. 3), or may be performed by the terminal device and the server in cooperation.

With reference to an exemplary application and implementation of the electronic device provided in the embodiments of this application, the information recommendation method provided in the embodiments of this application is described.

Figure 6A:
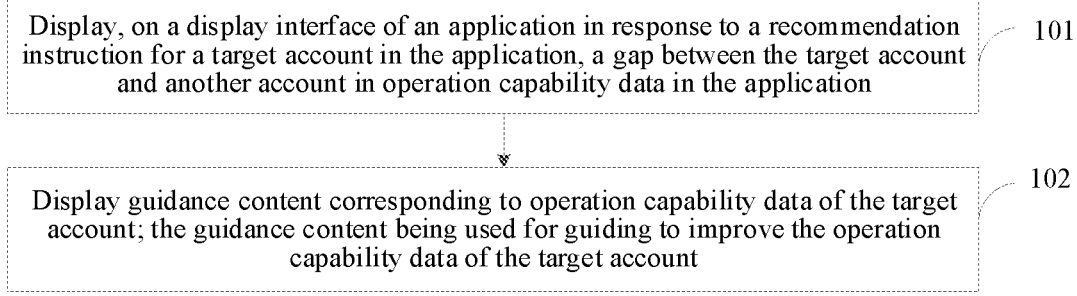
FIG. 6A is a schematic flowchart of an information recommendation method according to an embodiment of this application.

Referring to FIG. 6A, FIG. 6A is a schematic flowchart of an information recommendation method according to an embodiment of this application. Reference may be made to steps shown in FIG. 6A for description.

Step 101: Display, on a display interface of an application in response to a recommendation instruction for a target account in the application, a gap between the target account and another account in operation capability data in the application.

Herein, an application is installed on a terminal device. In a running process of the application, the terminal device acquires operation capability data of the target account in real time in response to the recommendation instruction for the target account in the application. Herein, the target account may be an account in a login state in the application, or any specified account. A type of the operation capability data may be preset. For example, in a game application, the operation capability data may include at least one of a power, a combat capability, and an equipment attribute of a game role of the account. In an office application, the operation capability data may include a quantity of times a user uses a toolkit or enters a shortcut key when using an office function (for example, a paste function) by using an account.

Then, the terminal device determines the gap between the operation capability data of the target account and the operation capability data of another account in the application, that is, a difference between the operation capability data of the target account and the operation capability data of the second account, where the second account refers to an account other than the target account in the application. An operation of determining the gap may be completed by the terminal device alone. For example, the terminal device locally compares the operation capability data of the target account with the operation capability data of the second account to obtain the gap. The operation of determining the gap may alternatively be completed in combination with the server. For example, the terminal device transmits the operation capability data of the target account to the server, and the server obtains the operation capability data of the second account from the log file of the application, compares the operation capability data of the target account with the operation capability data of the second account, to obtain the gap, and transmits the gap to the terminal device. In another example, the server may transmit the operation capability data of the second account in the log file to the terminal device, and the terminal device locally compares the operation capability data of the target account with the operation capability data of the second account to obtain the gap.

A manner of determining the gap is not limited in this embodiment of this application. For example, when the second account includes only one account, the operation capability data of the target account may be subtracted from the operation capability data of the second account to obtain the gap. When the second account includes a plurality of accounts, the operation capability data of the second account may be first statistically processed to obtain statistical data, and then the operation capability data of the target account is subtracted from the statistical data to obtain the gap, where the statistical data is, for example, an average value or a median value.

After obtaining the gap between the target account and the second account in operation capability data in the application, the terminal device displays the gap on the display interface of the application. A display manner of the gap is not limited in this embodiment of this application. For example, a recommendation interface is preset in the application (the recommendation interface is displayed on the display interface of the application). The terminal device responds to the recommendation instruction for the target account in the application, displays the recommendation interface, and displays the gap on the recommendation interface.

In some embodiments, when at least one of the following conditions is met, a recommendation instruction for the target account is generated: a trigger operation for a recommendation entry in the display interface is received; a keyword associated with the operation capability data is received; a current time matches preset recommendation time; it is detected that the application is started; and the operation capability data of the target account is continuously less than an average level within a specified time period; the average level including any one of statistical data of operation capability data of the second account and statistical data of operation capability data of an account in a same period; and the account in the same period representing an account that is in the second account and whose registration time is different from registration time of the target account by less than a registration duration threshold.

For example, when meeting at least one of the following conditions, the terminal device may generate a recommendation instruction for the target account, and each condition is separately described.

(1) A trigger operation for a recommendation entry in the display interface is received. For example, a recommendation entry is preset in the display interface of the application. When it is detected that the recommendation entry in the display interface is triggered, a recommendation instruction for the target account is generated. A specific type of the trigger operation is not limited in this embodiment of this application. For example, the trigger operation may be a touch operation, such as an operation of tapping or pressing for several seconds. In another example, the operation may be a non-touch operation, such as an operation of gesture interaction.

(2) A keyword associated with the operation capability data is received. For example, for a game application, keywords associated with the operation capability data may include "enhance", "strengthen", "upgrade", and the like. For an office application, keywords associated with the operation capability data may include "skill", "shortcut keys", and the like. A keyword input manner is not limited in this embodiment of this application, for example, the keyword input manner may include a handwritten input manner or a voice input manner. In some embodiments, in the application, a question and answer interface (displayed on the display interface of the application) dedicated to acquiring a keyword may be preset, so that a user enters a keyword in the question and answer interface.

(3) A current time matches a preset recommendation time. Recommendation time may be set according to an actual application scenario, for example, set to 8:00 p.m. each day.

(4) It is detected that the application is started. For example, a recommendation instruction is generated each time the application is started.

(5) The operation capability data of the target account is continuously less than an average level within a specified time period (such as one week or one month, which may be set according to an actual application scenario). The average level includes any one of statistical data of operation capability data of the second account and statistical data of operation capability data of an account in a same period. The account in the same period represents an account that is in the second account and whose registration time is different from registration time of the target account by less than a registration duration threshold. (for example, one week, which may be set according to an actual application scenario).

In the foregoing manner, information recommendation flexibility is improved, and at least one of the foregoing conditions may be used in an actual application scenario. Certainly, the foregoing conditions are only examples. According to different actual application scenarios, more conditions may be extended.

In some embodiments, the gap between the target account and the second account in operation capability data in the application may be displayed in this manner: acquiring a plurality of gap intervals and display effects respectively corresponding to the plurality of gap intervals; separately performing matching processing on the gap and the plurality of gap intervals; and displaying the gap according to a display effect corresponding to a successfully matched gap interval. The display effect includes at least one of a text effect and an icon effect.

For example, a plurality of preset non-overlapping gap intervals may be acquired, where different gap intervals may correspond to different display effects, and the display effects herein may include at least one of a text effect and an icon effect. After obtaining the gap between the target account and the second account in operation capability data in the application, matching processing is respectively performed on the gap and the plurality of gap intervals. When the gap is successfully matched with any gap interval (that is, the gap falls within the any gap interval), the gap is displayed according to a display effect corresponding to the any gap interval. In this way, the display effect of the gap can be close to the gap itself, thereby improving recommendation effectiveness from another perspective.

Step 102: Display guidance content corresponding to operation capability data of the target account; the guidance content being used for guiding to improve the operation capability data of the target account.

In addition to determining the gap, in this embodiment of this application, the terminal device further acquires the guidance content corresponding to the operation capability data of the target account, where the guidance content is used for instructing to improve the operation capability data of the target account, so as to reduce the gap. A form of the guidance content is not limited in this embodiment of this application, for example, may be text, a picture, or a video. For example, for a game application, when the operation capability data includes a combat capability of a game role, the guidance content may include a preset text prompt, for example, "start a mission" or "buy model clothes", to instruct to improve the combat capability of the game role. For an office application, if the operation capability data includes a quantity of toolkits used by a user to use an office function by using an account, the guidance content may include a location diagram of the toolkit in the application, so as to instruct the user to use the toolkit to implement the office function. If the operation capability data includes a quantity of times that a user uses a shortcut key when using an office function by using an account, the guidance content may include a key sequence of a shortcut key displayed in a text form and an office function that can be implemented by the shortcut key, so as to instruct the user to subsequently use the shortcut key.

The guidance content may be locally stored in the terminal device in advance, or may be stored in a database, a distributed file system of a server, a blockchain, or the like. This embodiment of this application sets no limitation on an execution sequence of determining the gap and acquiring the guidance content, for example, which may be performed simultaneously, or may be performed successively. After acquiring the guidance content corresponding to the operation capability data of the target account, the terminal device displays the guidance content on the display interface of the application, for example, displays the guidance content on a display region that is in the display interface and that is associated with the gap, so that the user learns the gap and the guidance content at the same time.

In some embodiments, between any steps, the method further includes: displaying introduction content corresponding to the operation capability data of the target account; the introduction content representing an improvement process of improving the operation capability data of the target account.

For example, the terminal device acquires, in response to the recommendation instruction for the target account in the application, the introduction content corresponding to the operation capability data of the target account. A storage location of the introduction content is not limited herein, and the introduction content may also be in a form of text, a picture, a video, or the like. The introduction content is used for describing a process of improving the operation capability data of the target account. For example, in a game application, the introduction content may include an image-text strategy of a mission, and may include a screenshot of another game role after being equipped with model clothes. In an office application, the introduction content may include a specific introduction of a toolkit or a shortcut key principle. With the introduction content, the guidance content may be further described, so that the user can understand an exemplary improvement process.

When the introduction content is preset, a mapping relationship among "operation capability data-guidance content-introduction content" may be set, that is, the guidance content and the introduction content may be set together, or a mapping relationship between "operation capability data-guidance content" and a mapping relationship between "operation capability data-introduction content" may be set, that is, the guidance content and the introduction content may be set separately. In the foregoing manner, diversity of information recommendation is improved, and a help effect of displayed information on a user is further improved.

In some embodiments, the guidance content includes a service entry. After step 102, the method further includes: displaying a plurality of candidate services in response to a trigger operation on the service entry in the guidance content, the service being used for improving the operation capability data of the target account; and invoking a triggered service in response to a trigger operation on any one of the displayed services.

Herein, the guidance content may include a service entry, and the operation capability data of the target account is improved with guidance by the service entry. For example, after displaying the guidance content on the display interface, the terminal device displays a plurality of candidate services in response to a trigger operation on the service entry in the guidance content, where the service herein is used for improving the operation capability data of the target account. Certainly, one service may alternatively be displayed herein, depending on an actual application scenario. Then, the terminal device invokes, in response to a trigger operation on any service, a service triggered by the trigger operation, so as to improve the operation capability data of the target account. In some cases, for example, when a candidate service includes only one service, the terminal device may not display the service by default, and directly invoke the service.

For example, in a game application, the service entry may be an "enhance" identifier. When it is detected that the user triggers (for example, taps) the "enhance" identifier, the terminal device displays a preset mission interface (displayed on the display interface of the application), and displays a plurality of selectable missions on the mission interface. The user may select a mission to play, so as to improve a combat capability of a game role of the target account, and entering the mission means invoking a service. When it is detected that the user triggers the "enhance" identifier, the terminal device may also display a preset shopping mall interface (displayed on the display interface of the application), and display a plurality of available model clothes on the shopping mall interface. The user may select model clothes for purchase, so as to improve the combat capability of the game role of the target account, and purchasing the model clothes means invoking a service. In another example, in an office application, the service entry may be a "tutorial" identifier. When it is detected that the user triggers the "tutorial" identifier, the terminal device displays a plurality of tutorials that use a toolkit or a shortcut key, and the user may select any tutorial to play, so as to learn how to use the toolkit or the shortcut key. Playing the tutorial means invoking a service, and a form of the tutorial may include an image-text tutorial or a video tutorial, which is not limited thereto. When the guidance content includes the service entry, the introduction content can be used for indicating the invoking process of the service corresponding to the guidance content.

As shown in FIG. 6A, in this embodiment of this application, the gap and the guidance content are displayed at the same time, to determine a reference value of the guidance content to the user. For example, when a larger gap is displayed, corresponding guidance content is more likely to be actually required by the user, so that the user quickly selects whether to browse the guidance content, thereby improving effectiveness of information recommendation. In addition, the gap is calculated for the operation capability data of the target account, which improves pertinence of different target accounts (different users).

Figure 6B:
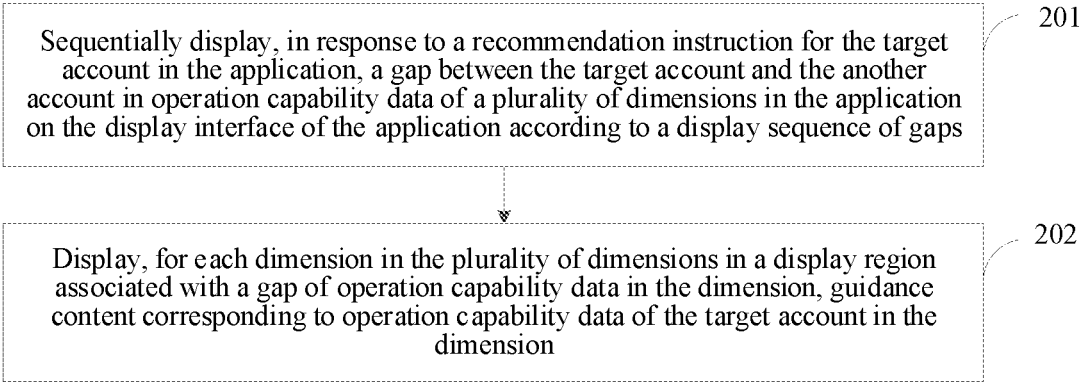
FIG. 6B is a schematic flowchart of an information recommendation method according to an embodiment of this application.

In some embodiments, referring to FIG. 6B, FIG. 6B is a schematic flowchart of an information recommendation method according to an embodiment of this application. Step 101 shown in FIG. 6A may be updated to step 201. In step 201, sequentially display, in response to a recommendation instruction for the target account in the application, a gap between the target account and the second account in operation capability data of a plurality of dimensions in the application on the display interface of the application according to a display sequence of gaps.

Herein, the operation capability data may be preset to include a plurality of dimensions. For example, in a game application, the operation capability data includes a power, a combat capability, a hit point, and the like of a game role of an account. In an office application, the operation capability data may include a quantity of times a toolkit is used or a shortcut key is entered for each application function when a plurality of application functions are used. In response to the recommendation instruction for the target account in the application, the terminal device acquires the operation capability data of the target account in a plurality of dimensions in the application. For operation capability data in each dimension, the terminal device determines a gap between the target account and the second account in operation capability data in the dimension. Then, gaps corresponding to operation capability data in the plurality of dimensions are sequentially displayed according to the display sequence of the gaps, where the display sequence of the gaps may be a descending order of the gaps. For example, gaps corresponding to the power, the combat capability, and the hit point are increased. Therefore, the gaps corresponding to the hit point, the combat capability, and the power are successively displayed on the display interface of the application. An actual manner of sequential display in this embodiment of this application is not limited, for example, may be a list type, and a larger gap is at an earlier location in the list (that is, more obvious).

In some embodiments, before sequentially displaying, according to a display sequence of the gap, gaps between the target account and the second account in operation capability data of a plurality of dimensions in the application, the method further includes: acquiring, from a log file, an improvement frequency of improving the operation capability data in each dimension by the target account; performing fusion processing on an improvement frequency of operation capability data in any dimension and a gap of the operation capability data in the any dimension, to obtain a fusion result of the any dimension; and performing sorting processing on fusion results respectively corresponding to the plurality of dimensions, to obtain a display sequence of the gaps.

Herein, an improvement record of improving the operation capability data in each dimension by the account may be recorded in a log file generated in a running process of the application, and each improvement record may include an invoked service, operation capability data before improvement, operation capability data after improvement, and recording time. In response to the recommendation instruction for the target account in the application, the terminal device acquires, from a local log file, an improvement record of improving the operation capability data in each dimension by the target account.

Then, for the operation capability data in each dimension, an improvement record in a specified time period is selected, and a ratio of a quantity of selected improvement records to that in the recording time period is used as the improvement frequency of the operation capability data in the dimension, where the recording time period may be set according to an actual application scenario. For example, for the combat capability, an improvement record is selected within a month from current time. If 30 improvement records are selected, an improvement frequency of the combat capability may be obtained as 30 times per month. A higher improvement frequency indicates that the user more values the operation capability data of the corresponding dimension. Therefore, for the operation capability data in each dimension, an improvement frequency of the operation capability data in the dimension and the gap of the operation capability data in the dimension are fused to obtain a fusion result of the dimension, where the fusion result is positively correlated with the improvement frequency, and the fusion result is also positively correlated with the gap. For example, product processing is performed on an improvement frequency of a combat capability and a gap of the combat capability, to obtain a fusion result of the combat capability. Certainly, the fusion processing may also be addition processing, exponential processing, or the like, which is not limited.

After the fusion result of the operation capability data in each dimension is obtained, sorting processing is performed on a plurality of fusion results, and an obtained sequence is a display sequence of gaps corresponding to the fusion result. The sorting processing may be in descending order, or certainly may be in another order. For example, if the sequence obtained after the sorting processing is "fusion result of the combat capability-fusion result of the power-fusion result of the hit point", the display order of the gaps is also "gap of the combat capability-gap of the power-gap of the hit point". In the foregoing manner, the display sequence of the gaps is obtained with reference to the improvement frequency of improving the operation capability data by using an account, which further improves pertinence of the target account and conforms to a tendency of improving operation capability data of a user for different dimensions.

In FIG. 6B, step 102 shown in FIG. 6A may be updated to step 202. In step 202, display, for each dimension in the plurality of dimensions in a display region associated with a gap of operation capability data in the dimension, guidance content corresponding to operation capability data of the target account in the dimension.

Herein, for the operation capability data in each dimension, the guidance content corresponding to the operation capability data in the dimension is displayed in a display region associated with the gap of the operation capability data in the dimension. A list form is used as an example. The first row of the list includes a gap corresponding to a hit point and guidance content corresponding to the hit point, the second row includes a gap corresponding to a combat capability and guidance content corresponding to the combat capability, and the third row includes a gap corresponding to a power and guidance content corresponding to the power, where the gaps respectively corresponding to the hit point, the combat capability, and the power decrease. In this way, it is ensured that a gap corresponding to each dimension and corresponding guidance content are displayed in a form of being associated with each other on the display interface. In addition, different dimensions also have a certain degree of differentiation.

Due to a size of the display interface of the application, gaps corresponding to operation capability data in a plurality of dimensions and corresponding guidance content may be sequentially displayed according to a display sequence of the gaps, until gaps corresponding to operation capability data in a specified quantity of dimensions and corresponding guidance content are displayed. On this basis, it may further be set that when a sliding operation or another operation on the display interface is received, a gap corresponding to operation capability data in a dimension that is not displayed and corresponding guidance content are displayed. In another example of the foregoing example, if a quantity is set to 2, that is, the displayed list includes two rows in total, the gap corresponding to the hit point and the guidance content corresponding to the hit point may be displayed in the first row of the list, and the gap corresponding to the combat capability and the guidance content corresponding to the combat capability are displayed in the second row. The user may display, by sliding the list, the gap corresponding to the power and the guidance content corresponding to the power in the list.

As shown in FIG. 6B, in this embodiment of this application, a more important gap and guidance content are preferentially displayed on the display interface, thereby further improving effectiveness of information recommendation, and facilitating the user to select guidance content that better meets a requirement of the user.

Figure 7A:
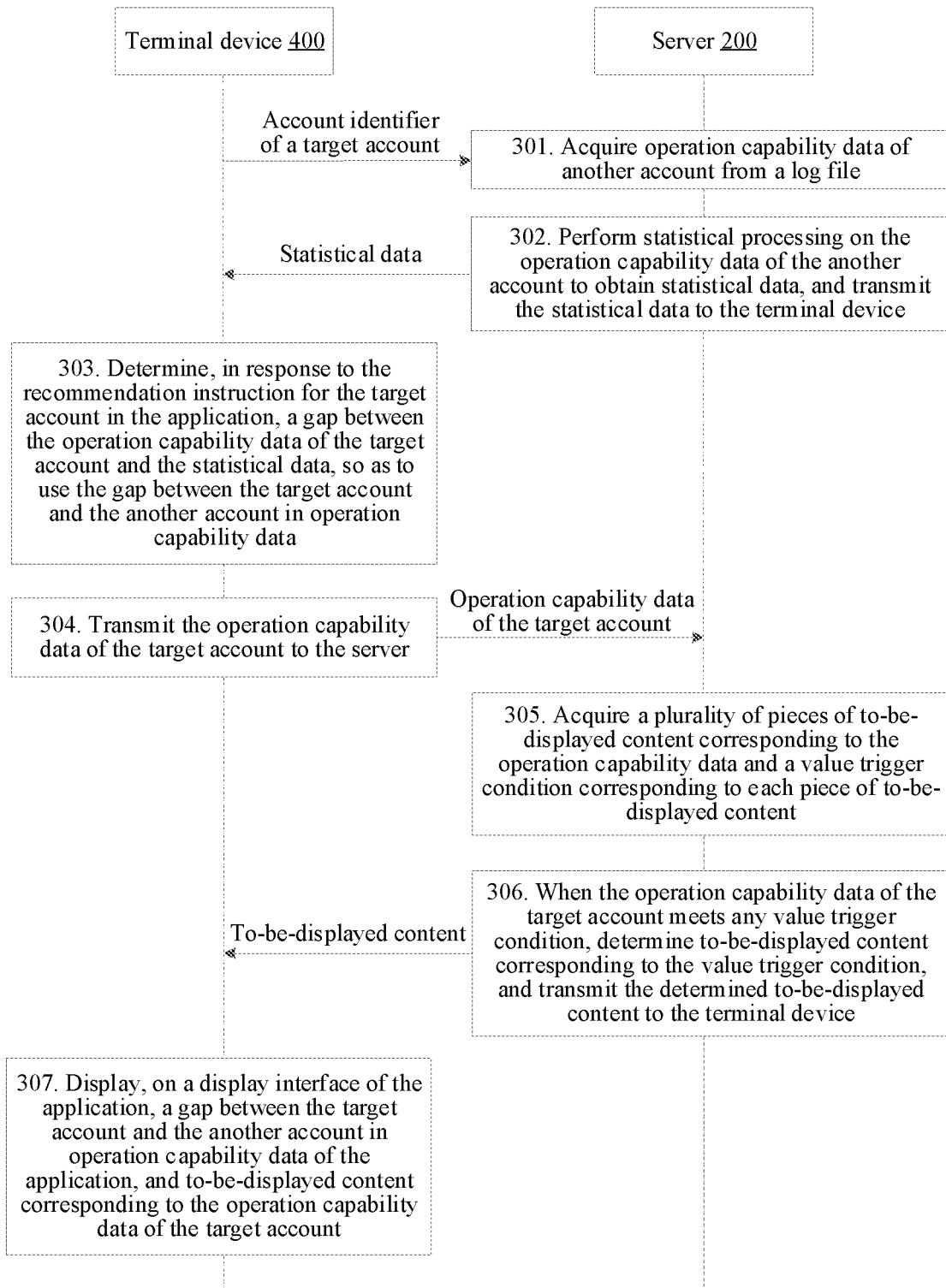
FIG. 7A is a schematic flowchart of an information recommendation method according to an embodiment of this application.

Referring to FIG. 7A, FIG. 7A is a schematic flowchart of an information recommendation method according to an embodiment of this application. Steps shown in FIG. 7A are described with reference to an architecture that includes a terminal device and a server shown in FIG. 3.

In step 301, the server acquires the operation capability data of the second account from the log file.

Herein, the log file may include operation capability data of each account in the application and recording time when the operation capability data is recorded. A storage location of the log file is not limited in this embodiment of this application, for example, may be a database, a distributed file system, or a blockchain network. The terminal device may transmit an account identifier of the target account to the server in advance, so that the server determines the second account other than the target account, and acquires the operation capability data of the second account from the log file. Herein, the target account may be an account in a login state in the application, or may be any specified account. Because the log file records a plurality of pieces of operation capability data of each account of the application in history, the server may acquire latest operation capability data of the second account from the log file, so as to ensure data effectiveness.

In some embodiments, after step 301, the method further includes: subtracting a duration threshold from a current time (e.g., a real-time time) to obtain discarding time; acquiring recording time of the operation capability data of the second account from the log file; and discarding, in the operation capability data of the second account, operation capability data whose recording time is earlier than the discarding time.

Herein, the server may subtract the specified duration threshold from a current time for implementing the acquiring operation to obtain the discarding time, where the acquiring operation herein is an operation of acquiring the operation capability data of the second account, and the duration threshold may be set according to an actual application scenario. When acquiring the operation capability data of the second account from the log file, the server can simultaneously obtain the recording time of the operation capability data of the second account.

Because some accounts may be in a long-term disabled state, operation capability data of the accounts may not be representative, in this embodiment of this application, operation capability data of such accounts may be filtered out (discarded). For example, the server determines, from the acquired operation capability data of the second account, operation capability data whose recording time is earlier than discarding time, and discards the determined operation capability data. Certainly, in step 301, the server may alternatively acquire only operation capability data that is of the second account and whose recording time is not earlier than the discarding time, that is, implement filtering of the operation capability data while implementing the acquiring operation. In the foregoing manner, effectiveness of the acquired operation capability data is further improved.

In step 302, the server performs statistical processing on the operation capability data of the second account to obtain statistical data, and transmits the statistical data to the terminal device.

A statistical processing manner is not limited in this embodiment of this application. For example, the obtained statistical data may be an average value, a median value, a mode, a minimum value, or a maximum value of the operation capability data of the second account. After obtaining the statistical data, the server transmits the statistical data to the terminal device.

Herein, the server may periodically perform step 301 and step 302, and transmit the obtained statistical data to the terminal device, so as to improve effectiveness of the statistical data stored in the terminal device. The server may alternatively transmit the operation capability data of the second account in the log file to the terminal device, and the terminal device locally performs statistical processing to obtain the statistical data. Similarly, the terminal device may periodically acquire the operation capability data of the second account from the log file (or the latest log file), and perform statistical processing to obtain the statistical data. In addition, the log file that includes the operation capability data of the second account may be stored locally in the terminal device, so that the terminal device directly acquires the operation capability data of the second account from the local log file, and performs statistical processing.

In step 303, the terminal device determines, in response to the recommendation instruction for the target account in the application, a gap between the operation capability data of the target account and the statistical data, so as to use the gap between the target account and the second account in operation capability data.

Herein, in response to the recommendation instruction for the target account in the application, the terminal device acquires the operation capability data of the target account in real time, and calculates the gap between the operation capability data of the target account and the statistical data, so as to use the gap as the gap between the target account and another account in operation capability data. For example, the terminal device determines a ratio of the operation capability data of the target account to the statistical data. A smaller ratio indicates a larger gap between the operation capability data of the target account and the statistical data.

In step 304, the terminal device transmits the operation capability data of the target account to the server.

Herein, in response to the recommendation instruction for the target account in the application, the terminal device transmits the operation capability data of the target account acquired in real time to the server. In addition to this manner, the server may acquire the operation capability data of the target account from the log file according to the account identifier of the target account.

An execution sequence between the step of determining the gap and the step of transmitting the operation capability data of the target account to the server is not limited in this embodiment of this application. For example, the steps may be performed simultaneously, or may be performed successively.

In step 305, the server acquires a plurality of pieces of to-be-displayed content corresponding to the operation capability data and a value trigger condition corresponding to each piece of to-be-displayed content; and the to-be-displayed content including at least one of the guidance content and introduction content; and the introduction content representing an improvement process of improving the operation capability data of the target account.

Herein, the server acquires, from a location such as a database, a distributed file system, or a blockchain network, a plurality of pieces of to-be-displayed content corresponding to operation capability data and a value trigger condition corresponding to each piece of to-be-displayed content. The to-be-displayed content includes at least one of guidance content and introduction content. The value trigger condition may be manually set, or may be generated according to a specific logic.

In some embodiments, before step 305, the method further includes: The server acquires an improvement record of the operation capability data by using the second account from the log file; the improvement record including an invoked service and operation capability data before improvement; and the service being used for improving the operation capability data of the target account; determining, when that a service in the improvement record is the same as a service corresponding to the to-be-displayed content, the operation capability data before improvement in the improvement record as sample data; acquiring a plurality of specified value intervals corresponding to the operation capability data, and determining a quantity of sample data corresponding to each specified value interval; and determining, when the quantity of sample data corresponding to the specified value interval meets a quantity condition, the specified value interval as the value trigger condition corresponding to the to-be-displayed content.

Herein, the server acquires the improvement record of the operation capability data of the second account from the log file, where each improvement record includes at least a service invoked and operation capability data before improvement, and the service is used for improving the operation capability data. For the operation capability data, a plurality of pieces of to-be-displayed content are set in advance, and each piece of to-be-displayed content is set to be corresponding to at least one service. For example, in a game application, for a combat capability, to-be-displayed content A and B are set in advance, the to-be-displayed content A is corresponding to model clothes $A_1$ and model clothes $A_2$, and the to-be-displayed content B is corresponding to model clothes $B_1$ and model clothes $B_2$.

Any to-be-displayed content is used as an example. For each acquired improvement record, if a service in the improvement record is the same as any service corresponding to the any to-be-displayed content, operation capability data before improvement included in the improvement record is determined as sample data. In addition, a plurality of non-overlapping specified value intervals corresponding to the operation capability data are acquired. For example, if a value range of the combat capability is 0-1000, ten equal divisions may be performed on the value range to obtain 10 specified value intervals. Certainly, a division manner of the specified value interval may be determined according to an actual application scenario, and is not limited thereto. For each specified value interval, a quantity of sample data that falls into the specified value interval is determined. When a quantity of sample data corresponding to a specified value interval meets a quantity condition, the specified value interval is determined as a value trigger condition corresponding to the any to-be-displayed content. For example, a value condition is greater than a specified quantity threshold, or a quantity of sample data corresponding to a specified value interval is ranked within the first N rankings in all specified value intervals, where N is an integer greater than 0. In the foregoing big data analysis manner, a value trigger condition is determined with reference to an improvement record of the second account, thereby improving accuracy and rationality of a finally obtained value trigger condition.

In some embodiments, in this manner, the server may acquire a plurality of pieces of to-be-displayed content that are corresponding to the operation capability data and a value trigger condition corresponding to each piece of to-be-displayed content: The server transmits a query request that includes the account identifier of the target account to a blockchain network, so that when receiving the query request, a node in the blockchain network queries the plurality of pieces of to-be-displayed content and the value trigger condition corresponding to each piece of to-be-displayed content in a blockchain, and returns a query result. The to-be-displayed content is corresponding to the operation capability data.

This embodiment of this application may also be implemented with reference to a blockchain technology. A blockchain is a new application mode of a computer technology such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and application service layer.

The underlying blockchain platform may include user management, basic service, smart contract, operation monitoring, and other processing modules. A user management module is responsible for management of identity information of all blockchain participants, including maintenance of public and private key generation (account management), key management, maintenance of a corresponding relationship between a real identity of a user and a blockchain address (authority management), and so on, and when authorized, supervises and audits transaction states of some real identities, and provides rule configuration for risk control (risk control audit). A basic service module is deployed on all blockchain node devices to verify validity of a service request, and records a valid request to a storage after completing consensus. For a new service request, a basic service first performs interface adaptation parsing and authentication processing (interface adaptation), then encrypts service information through a consensus algorithm (consensus management), completely and consistently transmits the new service request to a shared ledger (network communication) after encryption, and records and stores the new service request. A smart contract module is responsible for registration and issuance of a contract, as well as contract triggering and contract execution. A developer may define contract logic through a programming language, publish the contract logic to the blockchain (contract registration), according to logic of a contract term, call a key or other events to trigger execution, complete the contract logic, and further provide functions of contract upgrade and cancellation. An operation monitoring module is mainly responsible for deployment, configuration modification, contract configuration, cloud adaptation and visual output of a real-time state of a product during product operation, for example: alarming, monitoring a network condition, monitoring node device health state, and so on.

In this embodiment of this application, the blockchain may store to-be-displayed content corresponding to a plurality of accounts and value trigger conditions. The following uses an example in which an electronic device accesses a blockchain network to implement query of to-be-displayed content and a value trigger condition to describe an exemplary application of the blockchain network, where the to-be-displayed content is guidance content or introduction content.

For ease of understanding, the architecture shown in FIG. 4 is used for description. The electronic device 800 (such as a server or a terminal device) accesses the blockchain network 600 and becomes a client node of the blockchain network 600. When the electronic device 800 needs to query the to-be-displayed content and the value trigger condition, the electronic device 800 transmits a query request that includes the account identifier of the target account to the blockchain network in a transaction form, specifies, in the transaction, a smart contract that needs to be invoked to implement a query operation and a parameter transmitted in the smart contract, and the transaction further carries a digital signature signed by the electronic device 800 (for example, the digital certificate of the electronic device 800 is obtained by encrypting a digest of the transaction), and broadcasts the transaction to the blockchain network 600. The digital certificate may be obtained by the electronic device 800 by registering with the authentication center 700.

When receiving the transaction, the node 610 in the blockchain network 600 verifies the digital signature carried in the transaction. After verification of the digital signature succeeds, it is determined, according to the identity of the electronic device 800 carried in the transaction, whether the electronic device 800 has a transaction permission, and failure to verify any one of the digital signature or the permission verification may cause the transaction to fail. After the verification succeeds, a digital signature of the node 610 is signed, and is further broadcast in the blockchain network 600.

After a node 610 with the sorting function in the blockchain network 600 receives the successfully verified transaction, the transaction is filled into a new block and broadcast to nodes that provide the consensus service in the blockchain network 600.

The node 610 that provides a consensus service in the blockchain network 600 performs a consensus process on a new block to reach an agreement. The node 610 that provides a bookkeeping function appends the new block to the end of the blockchain and executes a transaction in the new block: For a transaction that queries the to-be-displayed content and the value trigger condition, the to-be-displayed content and the value trigger condition that are corresponding to the account identifier are queried from a state database, and the queried to-be-displayed content and the value trigger condition are transmitted to the electronic device 800. The state database stores data in a form of a key-value pair, and data stored in the state database is generally the same as data stored in a blockchain. When responding to a query transaction, a response is preferably made according to data in the state database, thereby improving response efficiency. Certainly, when the state database does not exist, a response is directly made according to the data in the blockchain.

Before performing a query, a related person (such as a background planner) of the application needs to store the account identifier, the to-be-displayed content corresponding to the account identifier, and the value trigger condition corresponding to the to-be-displayed content onto the blockchain. A storage process is similar to the foregoing query process. For example, the related person of the application generates, by using a held electronic device (which may be a client node or a naive node), a transaction for submitting the account identifier, the to-be-displayed content corresponding to the account identifier, and the value trigger condition corresponding to the to-be-displayed content, and broadcasts the transaction to the blockchain network 600. After the node 610 in the blockchain network 600 verifies the transaction, fills the block, and reaches consensus, the node 610 that provides the bookkeeping function appends the filled new block to the end of the blockchain, and executes the transaction in the new block: For the transaction for submitting the account identifier, the to-be-displayed content corresponding to the account identifier, and the value trigger condition corresponding to the to-be-displayed content, stores the account identifier, the to-be-displayed content corresponding to the account identifier, and the value trigger condition corresponding to the to-be-displayed content into the state database. For different accounts (account identifiers), corresponding to-be-displayed content and value trigger conditions corresponding to the to-be-displayed content may be separately specified for each account, or corresponding to-be-displayed content and value trigger conditions corresponding to the to-be-displayed content may be specified for a plurality of accounts, which is determined according to an actual service scenario. Because the data in the blockchain has a non-tampering feature, accuracy of the acquired to-be-displayed content and value trigger condition is ensured in the foregoing manner.

In step 306, when the operation capability data of the target account meets any value trigger condition, the server determines to-be-displayed content corresponding to the value trigger condition, and transmits the determined to-be-displayed content to the terminal device.

The server separately matches the operation capability data of the target account with each obtained value trigger condition. When the operation capability data of the target account meets any value trigger condition, the server determines to-be-displayed content corresponding to the value trigger condition, and transmits the determined to-be-displayed content to the terminal device, so as to be displayed on the display interface of the application of the terminal device. Certainly, when the terminal device acquires a plurality of pieces of to-be-displayed content and a value trigger condition corresponding to each piece of to-be-displayed content, the terminal device may also match the operation capability data with the value trigger condition.

In step 307, the terminal device displays, on the display interface of the application, the gap between the target account and the second account in operation capability data of the application, and to-be-displayed content corresponding to the operation capability data of the target account.

Herein, the terminal device displays, on the display interface of the application, the gap and the to-be-displayed content acquired from the server.

As shown in FIG. 7A, in this embodiment of this application, the terminal device may interact with the server, so as to implement information recommendation by using a computing capability of the server. Certainly, FIG. 7A is only an example of information recommendation, and the terminal device may implement information recommendation locally without using the server.

Figure 7B:
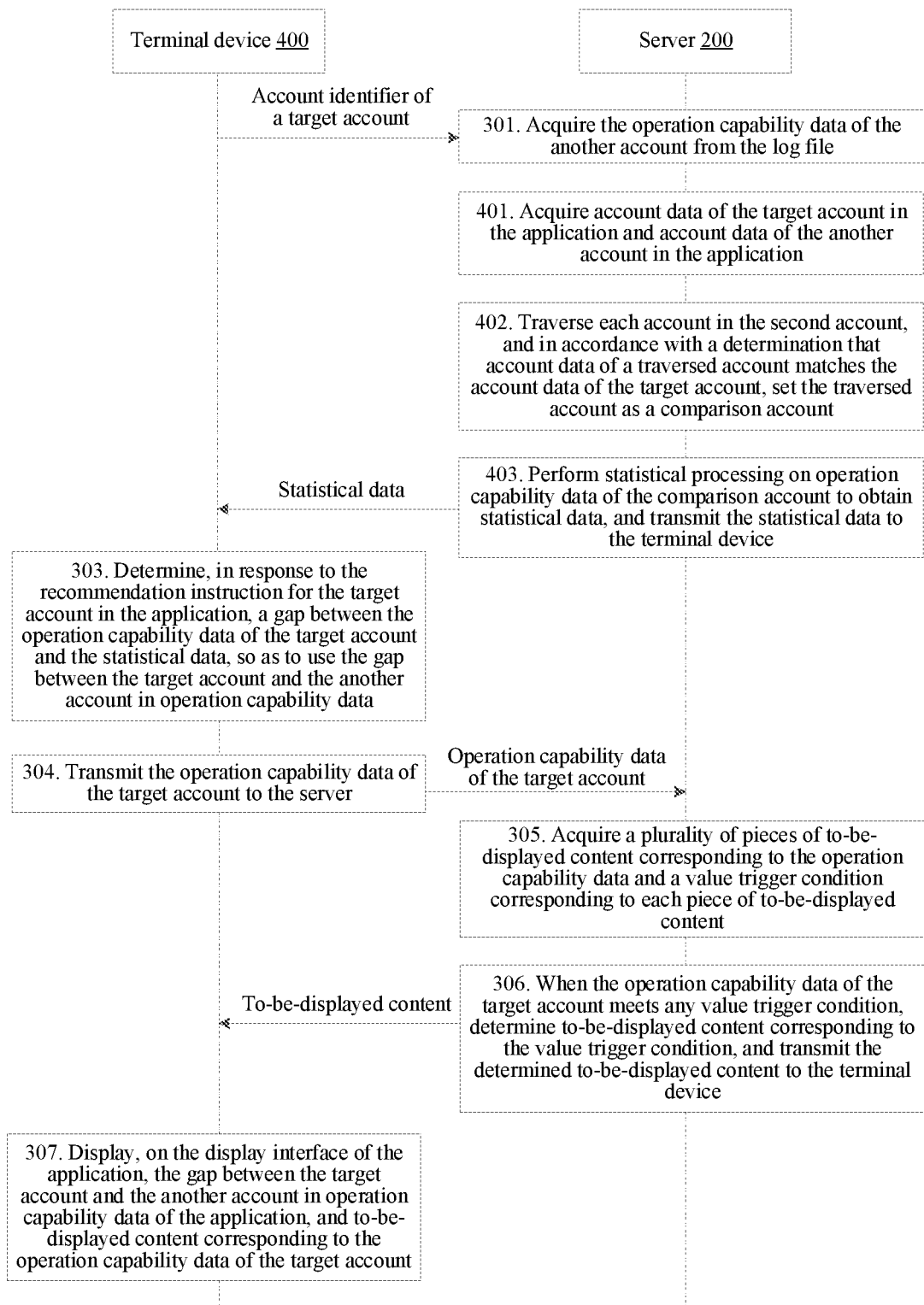
FIG. 7B is a schematic flowchart of an information recommendation method according to an embodiment of this application.

In some embodiments, referring to FIG. 7B, FIG. 7B is a schematic flowchart of an information recommendation method according to an embodiment of this application. Step 302 shown in FIG. 7A may be implemented by using step 401 to step 403, and description is provided with reference to the steps.

In step 401, the server acquires account data of the target account in the application and account data of the second account in the application; the account data including at least one of an account type and an account level.

Herein, the log file further stores account data of each account in the application. The server may acquire the account data of the second account from the log file, and obtain the account data of the target account transmitted by the terminal device. Certainly, the server may alternatively acquire the account data of the target account from the log file.

The account data includes at least one of an account type and an account level. For example, for a game application, the account type may be a profession of a game role of an account, and the account level may be a level of the game role, or may be a VIP level obtained by performing consumption by the account in the game application. For an office application, the account type may include a personal type and a commercial type. The account level may be an office skill level.

In step 402, the server traverses each account in the second account, and when account data of a traversed account is the same as the account data of the target account, determines the traversed account as a comparison account.

Herein, the second account is selected according to the account data of the target account. For example, traversal processing is performed on each account in the second account. When account data of the traversed account is the same as the account data of the target account, the traversed account is used as a comparison account, so as to facilitate differentiation.

In some embodiments, after step 402, the method further includes: adding an account having a buddy relationship with a to-be-processed account to a buddy network of the to-be-processed account, and adding a new account having a buddy relationship with an account in the buddy network to the buddy network until a preset stop condition is met; the to-be-processed account including any one of the comparison account and the target account; and discarding the operation capability data of the comparison account when an account overlapping degree between a buddy network of the comparison account and a buddy network of the target account is less than an overlapping degree threshold.

In this embodiment of this application, the comparison account may be further selected according to the buddy relationship. For example, an account having a buddy relationship with the to-be-processed account is added to the buddy network of the to-be-processed account, and the buddy network is iterated. In each iteration, a new account having a buddy relationship with an account in the buddy network is added to the buddy network until the preset stop condition is met. The to-be-processed account includes any one of the target account and the comparison account. The stop condition may be that a quantity of accounts in the buddy network reaches a specified account quantity threshold, or may be that a specified quantity of iterations is reached. This is not limited herein. The buddy network in this embodiment of this application refers to an account set, and does not refer to a network architecture.

In the foregoing manner, a buddy network corresponding to the target account and a buddy network corresponding to each comparison account may be constructed. For each comparison account, an account overlapping degree between a buddy network of the comparison account and the buddy network of the target account is determined. When the account overlapping degree is less than a preset overlapping degree threshold, operation capability data of the comparison account is discarded, where the overlapping degree threshold may be specified according to an actual application scenario. The account overlapping degree may be a quantity of same accounts in the two buddy networks/a total quantity of accounts included in the two buddy networks. For example, a quantity of accounts included in a buddy network A corresponding to the target account is 10, a quantity of accounts included in a buddy network B corresponding to a comparison account is 10, and a quantity of same accounts included in the buddy network A and the buddy network B is 5. In this case, the account overlapping degree between the buddy network A and the buddy network B is 5/(10+10). Accounts having a buddy relationship are more likely to have a same or similar tendency of improving operation capability data. Therefore, in the foregoing manner, reference meanings of the comparison account can be further improved, and effective filtering of the operation capability data of the second account can be implemented.

In step 403, the server performs statistical processing on operation capability data of the comparison account to obtain statistical data, and transmits the statistical data to the terminal device.

Herein, the server performs statistical processing on all the filtered operation capability data of the comparison account to obtain statistical data, and transmits the statistical data to the terminal device. In some cases, the terminal device may locally perform step 401 to step 403 to obtain the statistical data.

As shown in FIG. 7B, in this embodiment of this application, the second account is selected (filtered) according to the account data of the target account, so as to obtain a comparison account with more reference significance, so that the target account is effectively compared horizontally, thereby improving accuracy of finally obtained statistical data.

The following describes an exemplary application of this embodiment of this application in an actual application scenario. For ease of understanding, a game application is used as an example for description. The information recommendation solution provided in this embodiment of this application may be integrated into an intelligent robot program of the game application, and become an "enhancement" recommendation system embedded in the intelligent robot program. The "enhancement" recommendation system can instruct a user to effectively enhance attribute data of a game role of an account, that is, implement an information recommendation function.

Figure 8:
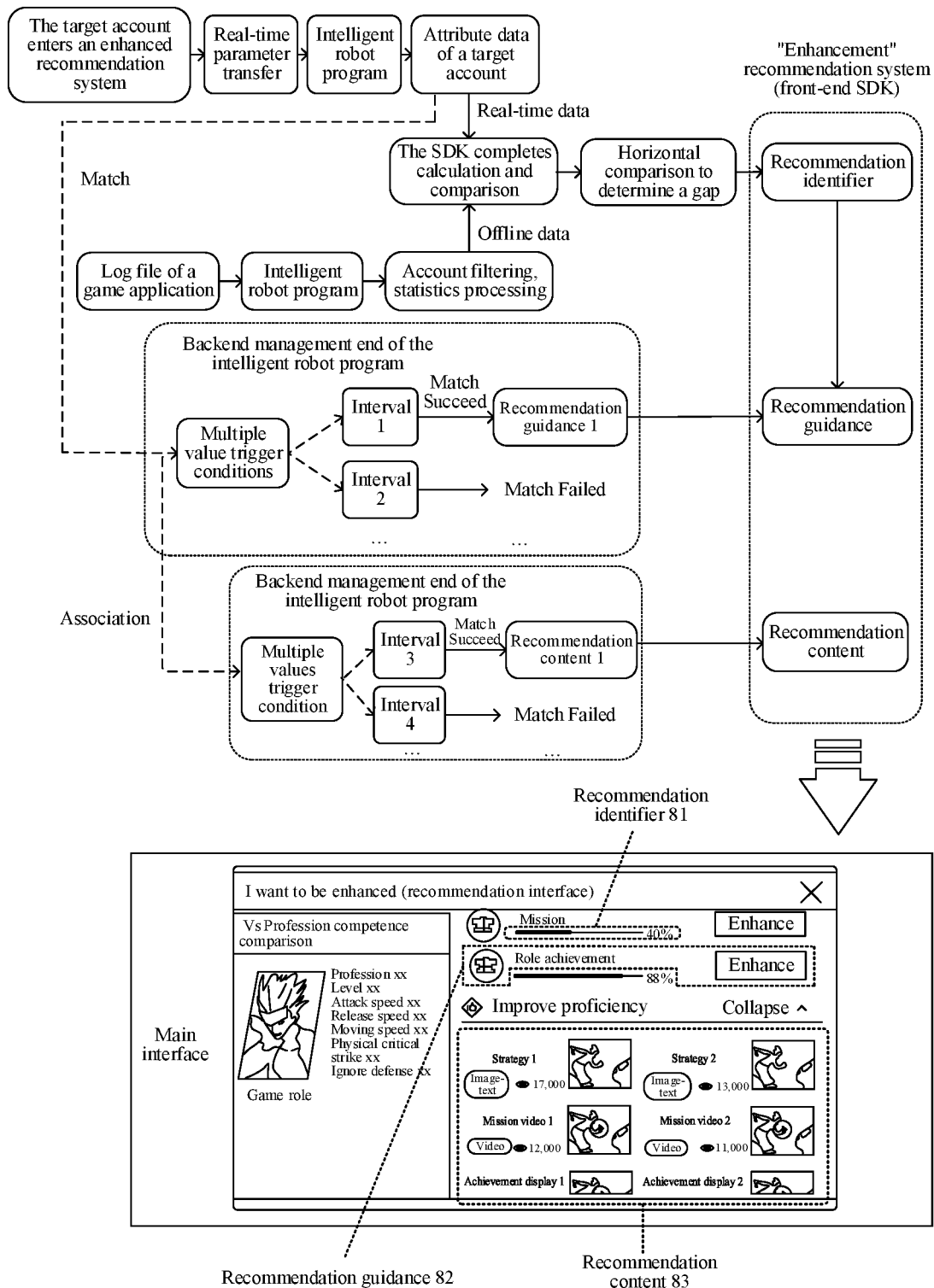
FIG. 8 is a schematic diagram of information recommendation according to an embodiment of this application.

An embodiment of this application provides a schematic diagram of information recommendation shown in FIG. 8. In FIG. 8, first, a target account enters an "enhancement" recommendation system. For example, a recommendation entry is specified on a main interface of the game application. When it is detected that the recommendation entry is triggered (for example, tapped) by a user, it is determined that an account (that is, the target account) in a login state in the game application enters the "enhancement" recommendation system. When it is detected that the target account enters the "enhancement" recommendation system, the intelligent robot program obtains the attribute data of the game role of the target account in real time by using a specified interface, where the attribute data may be defined by a related person (such as a planner) of the game application according to an actual requirement of the game application. The attribute data may include two types. One type is natural attribute data in the game application (corresponding to the foregoing account data), for example, may include a profession, a level, and a VIP level of the game role. The other type is recommendation attribute data (corresponding to the foregoing operation capability data), for example, may include a power, a combat capability, points of model clothes, and the like of the game role.

The intelligent robot program may further acquire attribute data of a game role in another account from a log file of the game application, and filter the second account according to the natural attribute data of the target account. For example, an account whose VIP level is the same as the target account is filtered from the second account, and the filtered account corresponds to the foregoing comparison account. Then, statistical processing is performed on the recommendation attribute data of the filtered account to obtain statistical data, such as an average value or a median value. If recommendation attribute data in a plurality of dimensions exists, for example, the recommendation attribute data includes a power, a combat capability, and points of model clothes, statistical data in a corresponding dimension is separately calculated for the recommendation attribute data in the dimension. In addition, a process of filtering the account and calculating the statistical data can be performed before the target account enters the "enhancement" recommendation system. That is, the obtained statistical data is offline data. For example, a periodic timing task is specified, the account is filtered from the log file at 8 a.m. each day, and the statistical data is obtained by means of calculation. This ensures that the offline statistical data can be quickly acquired when the target account enters the "enhancement" recommendation system. When a device has a strong computing capability, the process of filtering the account and obtaining the statistical data by means of calculation may also be performed in real time when the target account enters the "enhancement" recommendation system.

After obtaining the recommendation attribute data of the target account, the intelligent robot program compares the recommendation attribute data of the game role in the target account with the statistical data in a horizontal direction by using a built-in software development kit (SDK), to obtain a gap between the target account and the second account in recommendation attribute data, that is, a recommendation identifier shown in FIG. 8. For example, a ratio between the recommendation attribute data of the target account and the statistical data may be calculated. A smaller ratio indicates a larger gap. The information recommendation solution provided in this embodiment of this application may be integrated into various applications such as a mini program, a PC application, a mobile terminal APP, embedded HTML5, and an official account. Therefore, the information recommendation function is implemented based on different front-end forms, and a form of integration is not limited to an SDK.

In addition to calculating the gap, as shown in FIG. 8, at a background management end (corresponding to the foregoing server) of the intelligent robot program, the recommendation attribute data of the target account is matched with a plurality of specified value trigger conditions, where each value trigger condition corresponds to one recommendation guidance, and the recommendation guidance corresponds to the foregoing guidance content. A case in which the value trigger condition is a value interval is used as an example in FIG. 8, and an interval 1 and an interval 2 are exemplarily shown. When the recommendation attribute data of the target account meets any specified value interval (that is, the recommendation attribute data is successfully matched with any value interval), a recommendation guidance (for example, a recommendation guidance 1 corresponding to the interval 1 in FIG. 8) corresponding to a met value interval is determined, so as to be displayed on a display interface of the game application.

In addition to the recommendation guidance, a plurality of pieces of recommendation content may be preset, and a corresponding value trigger condition may be specified for each piece of recommendation content, for example, an interval 3 and an interval 4 shown in FIG. 8. When the recommendation attribute data of the target account meets any specified value interval (that is, the recommendation attribute data is successfully matched with any value interval), recommendation content (for example, recommendation content 1 corresponding to the interval 3 in FIG. 8) corresponding to a met value interval is determined, so as to be displayed on a display interface of the game application. The recommendation content is corresponding to the foregoing introduction content, and is used for providing more detailed extension introduction.

After the recommendation identifier, the recommendation guidance, and the recommendation content that need to be displayed are determined, the three may be displayed on the display interface of the game application. For example, a recommendation interface "I want to be enhanced" is preset, and the recommendation identifier, the recommendation guidance, and the recommendation content are displayed on the recommendation interface. During implementation at the bottom layer, different scenario codes may be specified for different interfaces in the game application. When it is detected that the target account enters the "enhancement" recommendation system, the back-end server outputs the scenario codes of the recommendation interface, so as to display a window-like recommendation interface on a main interface of the game application. Certainly, the recommendation interface may also be a full-screen interface. FIG. 8 shows an example of the recommendation interface, and a recommendation identifier 81, a recommendation guidance 82, and recommendation content 83 are displayed on the recommendation interface.

Specific display forms of the recommendation identifier, the recommendation guidance, and the recommendation content may be specifically specified according to an actual application scenario. In FIG. 8, the recommendation guidance is associated with a display region of the recommendation identifier, and the recommendation content is separately displayed in another display region. The recommendation identifier includes a ratio and a display effect of the ratio. Because a smaller ratio indicates a larger gap, a recommendation identifier and a recommendation guidance corresponding to recommendation attribute data in each dimension may be sequentially displayed in ascending order of ratios.

The display effect of the ratio is not limited in this embodiment of this application. As shown in FIG. 9, a plurality of ratio intervals (corresponding to the foregoing gap interval) may be preset. Different ratio intervals correspond to different display effects, and the display effect may include at least one of a text effect and an icon effect. When the determined ratio falls into a ratio interval, the ratio is displayed on the recommendation interface according to a display effect corresponding to the ratio interval.

The recommendation guidance includes an icon, a title name (such as "mission" and "role achievement" in FIG. 8), and an "enhance" identifier. The "enhance" identifier corresponds to the service entry described above. A user can tap the "enhance" identifier to enter a particular mission or purchase model clothes. A type of the recommendation content shown in FIG. 8 includes an image-text form and a video form (which is not limited thereto), and further shows a viewing quantity of each piece of recommendation content. When recommendation attribute data in a plurality of dimensions is included, recommendation content corresponding to the recommendation attribute data in the plurality of dimensions may be together displayed in a display region of the recommendation content. According to an actual application scenario, other information may also be displayed on the recommendation interface, for example, includes but is not limited to the recommendation attribute data of the game role of the target account, for example, a profession, a level, and an attack speed of the game role of the target account shown in FIG. 8.

Figure 10:
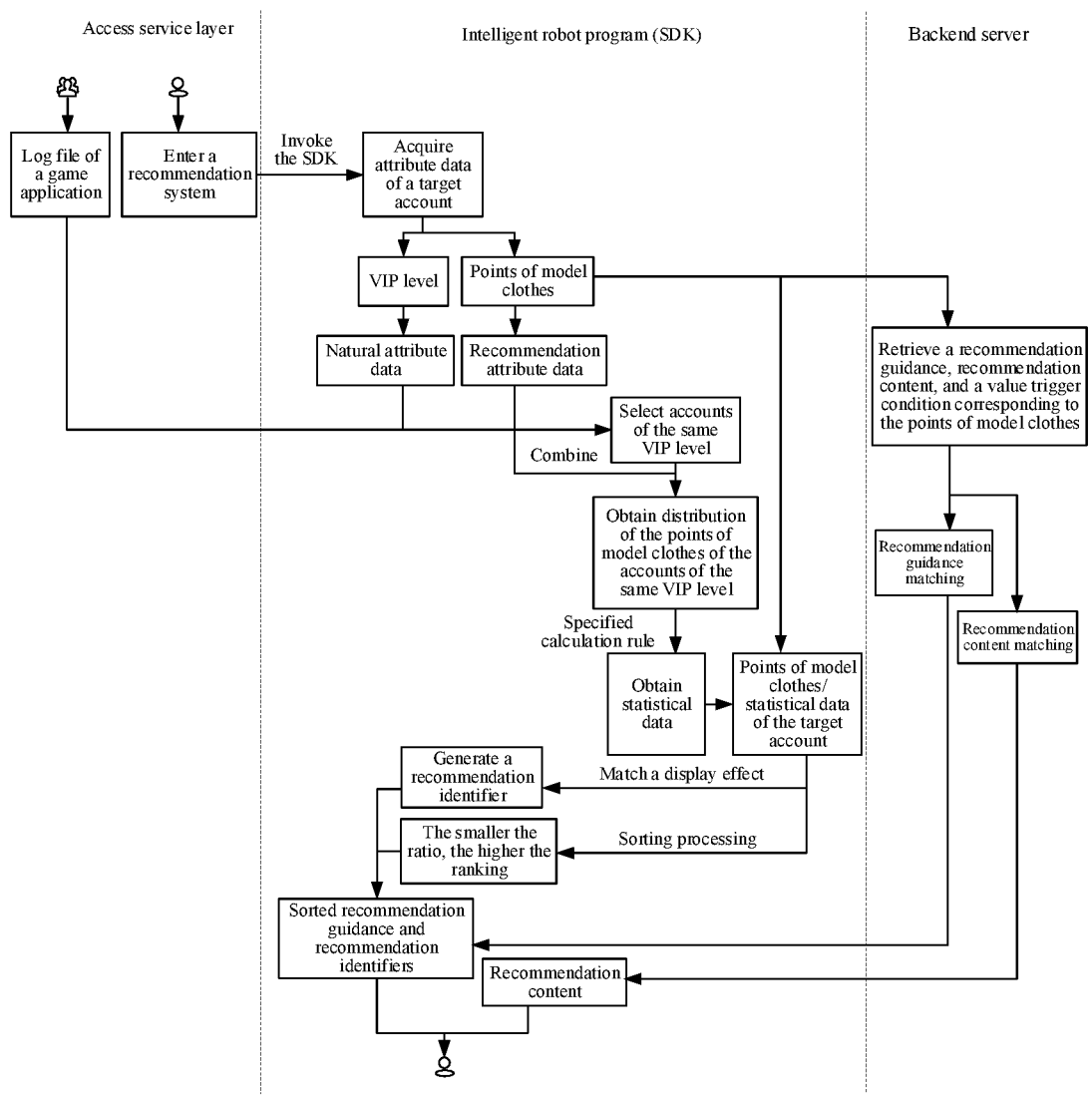
FIG. 10 is a schematic diagram of information recommendation according to an embodiment of this application.

An embodiment of this application further provides a schematic diagram of information recommendation shown in FIG. 10. In FIG. 10, a case in which natural attribute data is a VIP level and recommendation attribute data is points of model clothes of a game role is used as an example for description. The points of model clothes are bonuses in a game application, and may be used for exchanging model clothes. In an access service layer, a log file stores attribute data of another account. The log file can be stored in a background database or another storage location. A user with a target account can tap a recommendation entry displayed on an interface of the game application to enter an "enhancement" recommendation system. When it is detected that the target account enters the "enhancement" recommendation system, a SDK in an intelligent robot program is invoked, so as to acquire attribute data of a game role of the target account, which specifically includes a VIP level and points of model clothes. Then, an account that has a same VIP level as the target account is selected from another account included in the log file according to the VIP level of the target account, and statistical processing is performed on points of model clothes of the selected account according to a preset calculation rule to obtain statistical data. A ratio of the points of model clothes of the target account to the statistical data is determined, and a display effect is matched according to the ratio to generate a to-be-displayed recommendation identifier.

In addition, in the back-end server, a preset recommendation guidance, recommendation content, and value trigger condition that are corresponding to points of model clothes are retrieved, where the recommendation guidance and the recommendation content may be specified together, for example, a mapping relationship among "recommendation guidance-recommendation content-value trigger condition" is specified, or may be separately specified, for example, a mapping relationship between "recommendation guidance-value trigger condition" and a mapping relationship between "recommendation content-value trigger condition" are specified. The points of model clothes of the target account are matched with the value trigger condition, a to-be-displayed recommendation guidance and to-be-displayed recommendation content are determined according to a matching result, and the to-be-displayed recommendation guidance and the to-be-displayed recommendation content are transmitted to the front-end intelligent robot program.

The intelligent robot program displays the to-be-displayed recommendation identifier, the to-be-displayed recommendation guidance, and the to-be-displayed recommendation content on a front-end recommendation interface of the game application. When recommendation attribute data in a plurality of dimensions is included, recommendation identifiers and recommendation guidance corresponding to the recommendation attribute data in the plurality of dimensions are further sorted and displayed in ascending order of ratios.

Figure 11:
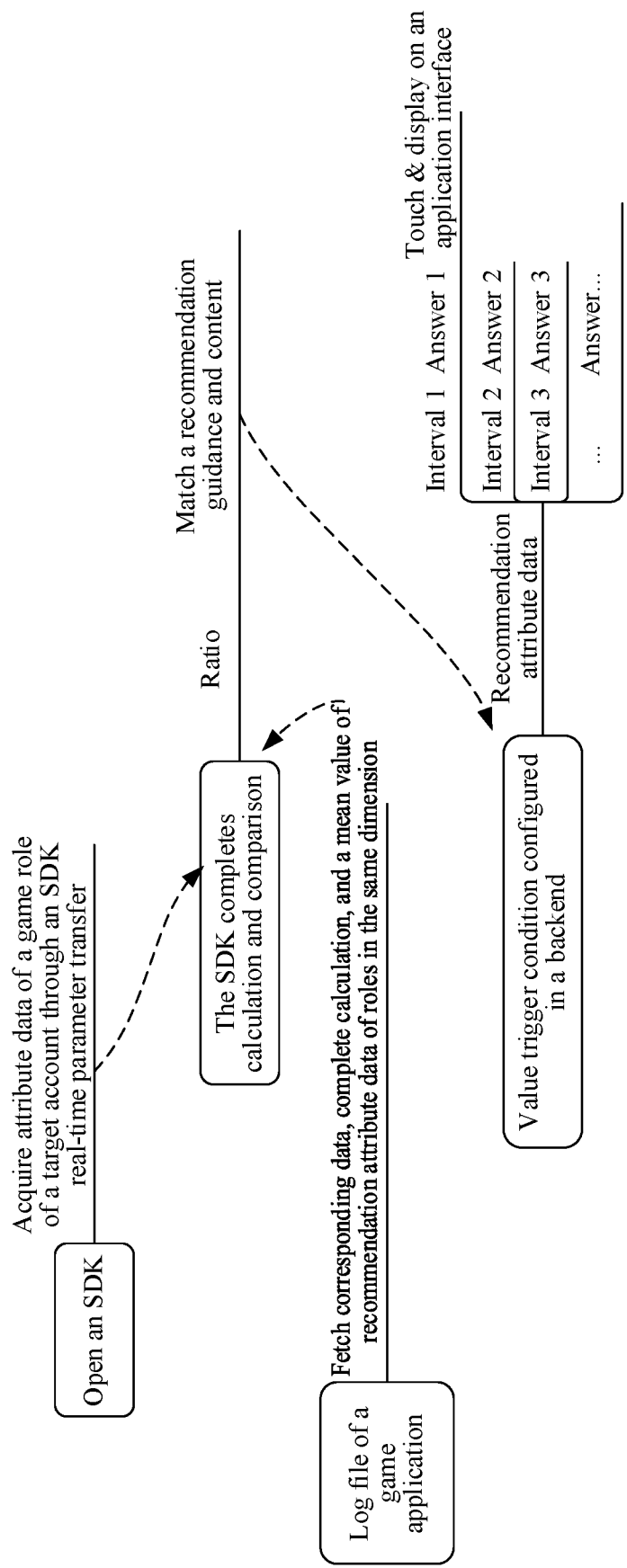
FIG. 11 is a schematic diagram of a data processing process in information recommendation according to an embodiment of this application.

An embodiment of this application further provides a schematic diagram of a data processing process in information recommendation shown in FIG. 11. In FIG. 11, first, attribute data of a game role of a target account is obtained by using SDK real-time parameter transfer in a game application. According to the natural attribute data of the target account, recommendation attribute data of another account whose natural attribute data is the same as that of the target account is retrieved from a log file, and calculation processing is performed to obtain an average value of the recommendation attribute data of the game role in the same dimension as that of the target account, that is, statistical data. Then, the SDK is used for calculating a ratio of the recommendation attribute data of the target account to the statistical data. In addition, in a back-end server, the recommendation attribute data of the target account is matched with a preset value trigger condition to obtain a corresponding answer (as shown in answer 1 in FIG. 11), where the answer is used for reaching and displaying on a display interface of the application, and the answer includes at least one of a recommendation guidance and recommendation content.

Figure 12A:
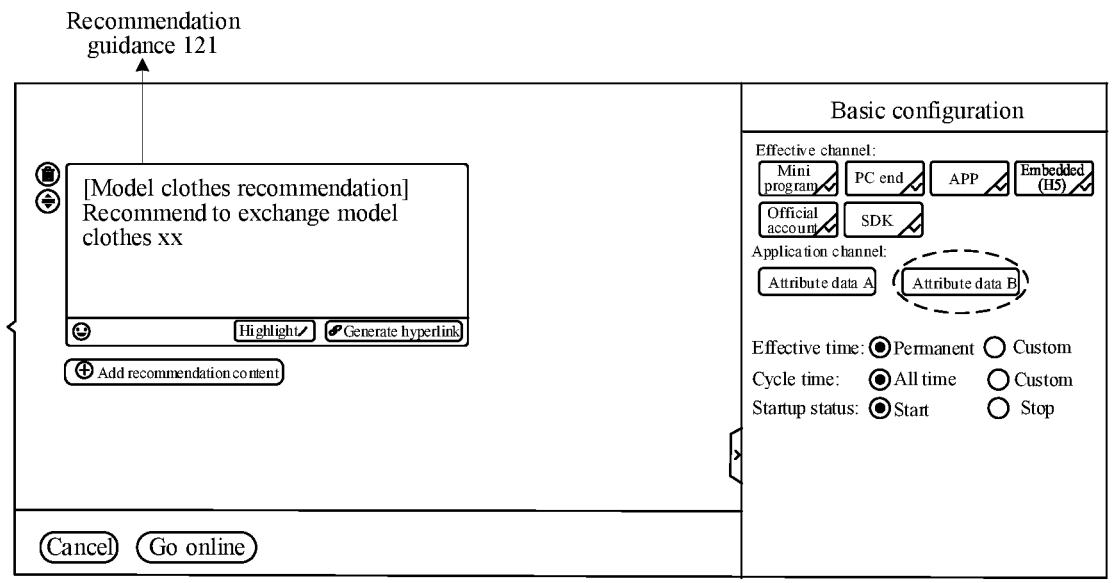
FIG. 12A is a schematic diagram of a configuration interface according to an embodiment of this application.

An embodiment of this application further provides a configuration interface of a back-end server shown in FIG. 12A. In the configuration interface, an effective channel for information recommendation may be configured, such as a mini program of a game application, a PC client, a mobile terminal APP, embedded HTML5, and an official account. For example, that the configured effective channel includes a PC client means that an "enhancement" recommendation system is added to the game application on the PC client. In the configuration interface, an application channel may be further configured, and the application channel includes recommendation attribute data in each dimension, for example, attribute data A and attribute data B shown in FIG. 12A. For the recommendation attribute data in each dimension, a related person may configure a corresponding recommendation guidance according to an actual requirement, for example, a recommendation guidance 121 corresponding to the attribute data B shown in FIG. 12A specifically includes text "[Model clothes recommendation] Recommend to exchange model clothes xx". Certainly, the recommendation guidance may alternatively be configured to include an icon and/or content in another format. A hyperlink (that is, a service entry) may be specified in the recommendation guidance, so as to implement a jump function (corresponding to the foregoing response to the trigger operation on the service entry), for example, jump from the recommendation guidance to a mission interface or a shopping mall interface. In addition, an effective time, a cycle time, and a startup status of information recommendation may be further configured. The related personnel can tap the "apply" identifier on the configuration interface to enable the configuration on the configuration interface.

Figure 12B:
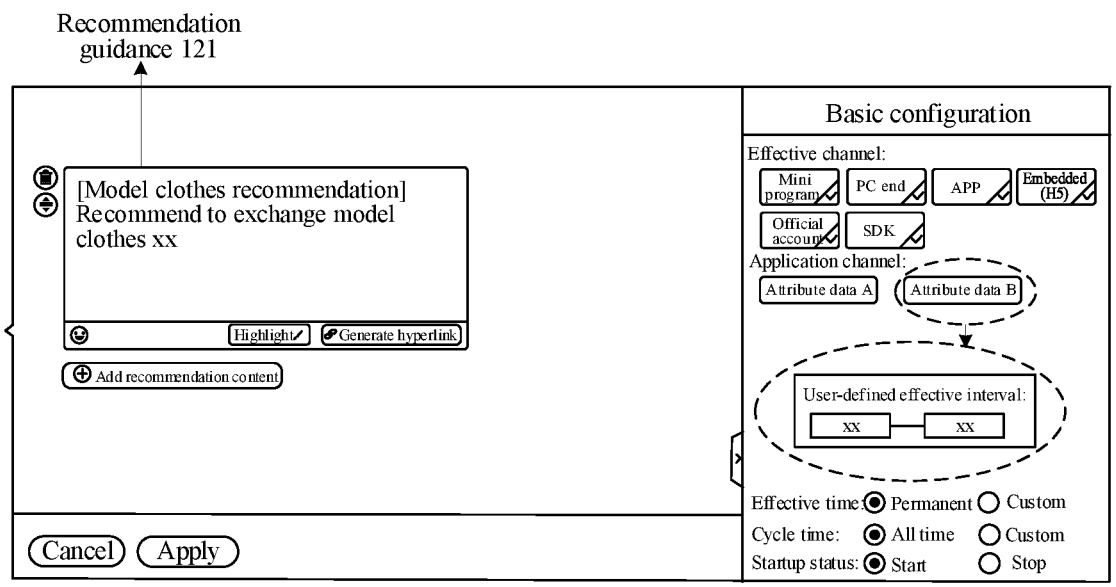
FIG. 12B is a schematic diagram of a configuration interface according to an embodiment of this application.
Figure 12C:
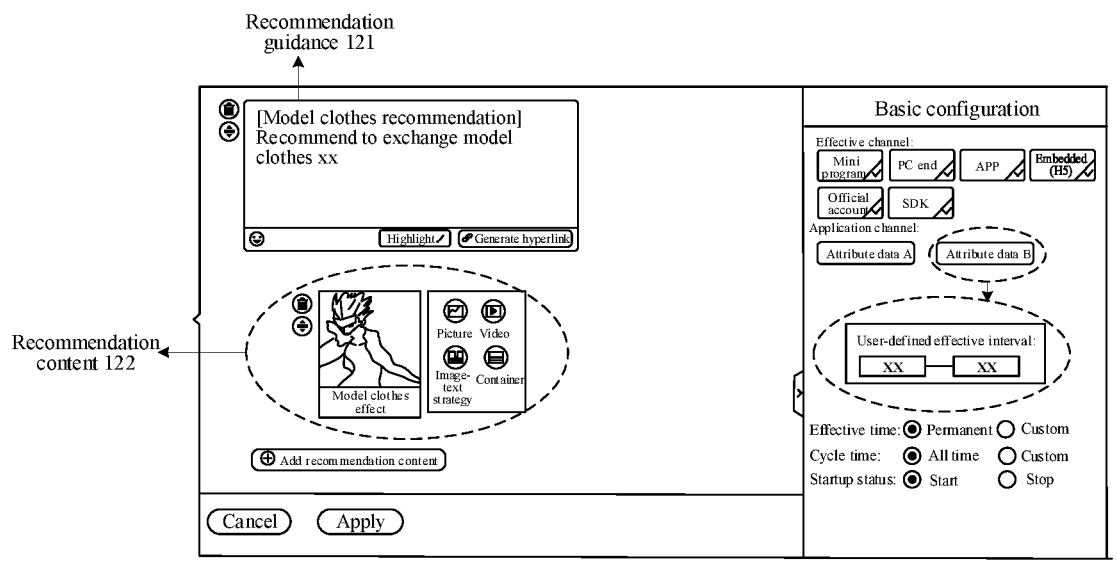
FIG. 12C is a schematic diagram of a configuration interface according to an embodiment of this application.

On the basis of FIG. 12A, a value trigger condition corresponding to the recommendation guidance may be further configured. As shown in FIG. 12B, for attribute data B, an effective interval (a value interval) may be customized by the related person. After the configuration is applied, if the attribute data B of the target account meets the effective interval, the server transmits the recommendation guidance corresponding to the effective interval to the terminal device, so as to display the recommendation guidance on the recommended interface of the game application. The recommendation content corresponding to the recommendation attribute data may also be configured in the configuration interface. As shown in FIG. 12C, the recommendation content 122 may be in a form of a picture, a video, an image-text strategy, a container, or the like, and the same value trigger condition may be configured for the recommendation guidance and the recommendation content. For example, a value trigger condition may correspond to one recommendation guidance and a plurality of pieces of recommendation content. Certainly, in an actual application scenario, a corresponding value trigger condition may be separately configured for the recommendation guidance and the recommendation content.

Compared with always performing fixed improvement recommendation on a user in a related technology, in this embodiment of this application, accounts in the same dimension are compared in an omni-directional manner for different accounts, so as to provide a more pertinent recommendation identifier, recommendation guidance, and recommendation content, thereby improving accuracy and user experience of information recommendation. In a game application, closed-loop experience of "recommendation-enhancement-recommendation" can be implemented, thereby improving user participation and activity in the game application. By preferentially displaying information of a higher degree of importance, it is ensured that a quantity of information displayed on a front end is not excessively large, and recommendation attribute data of more dimensions and finer granularities can be partitioned.

The following continues to describe an example structure in which an information recommendation apparatus 455 provided in the embodiments of this application is implemented as a software module. In some embodiments, as shown in FIG. 5, the software module of the information recommendation apparatus 455 stored in the memory 450 may include a display module 4551, configured to display, on a display interface of an application in response to a recommendation instruction for a target account in the application, a gap between the target account and another account in operation capability data in the application; and display guidance content corresponding to operation capability data of the target account; the guidance content being used for guiding to improve the operation capability data of the target account.

In some embodiments, the display module 4551 is further configured to sequentially display, according to a display sequence of the gap, gaps between the target account and the second account in operation capability data of a plurality of dimensions in the application; and displaying, for each dimension in the plurality of dimensions in a display region associated with a gap of operation capability data in the dimension, guidance content corresponding to operation capability data of the target account in the dimension.

In some embodiments, the display module 4551 is further configured to display introduction content corresponding to the operation capability data of the target account; the introduction content representing an improvement process of improving the operation capability data of the target account.

In some embodiments, the information recommendation apparatus 455 further includes a frequency acquiring module, configured to acquire, from a log file, an improvement frequency of improving the operation capability data in the dimension by the target account; a fusion module, configured to perform fusion processing on the improvement frequency of the operation capability data in the dimension and the gap of the operation capability data in the dimension, to obtain a fusion result of the dimension; and a sorting module, configured to perform sorting processing on fusion results respectively corresponding to the plurality of dimensions, to obtain a display sequence of the gaps.

In some embodiments, the guidance content includes a service entry. The information recommendation apparatus 455 further includes a service display module, configured to display a plurality of candidate services in response to a trigger operation on the service entry in the guidance content, the service being used for improving the operation capability data of the target account; and a service invoking module, configured to invoke a triggered service in response to a trigger operation on any one of the displayed services.

In some embodiments, the information recommendation apparatus 455 further includes an instruction generation module, configured to: when at least one of the following conditions is met, generate a recommendation instruction for the target account: a trigger operation for a recommendation entry in the display interface is received; a keyword associated with the operation capability data is received; current time matches a preset recommendation time; it is detected that the application is started; and the operation capability data of the target account is continuously less than an average level within a specified time period; the average level including any one of statistical data of operation capability data of the second account and statistical data of operation capability data of an account in a same period; and the account in the same period representing an account that is in the second account and whose registration time is different from registration time of the target account by less than a registration duration threshold.

In some embodiments, the information recommendation apparatus 455 further includes a data acquiring module, configured to acquire the operation capability data of the second account from the log file; a statistical module, configured to perform statistical processing on the operation capability data of the second account to obtain statistical data; and a gap determining module, configured to determine a gap between the operation capability data of the target account and the statistical data, so as to use the gap as the gap between the target account and the second account in operation capability data.

In some embodiments, the information recommendation apparatus 455 further includes: a discarding time determining module, configured to subtract a duration threshold from a current time to obtain a discarding time; a recording time acquiring module, configured to acquire recording time of the operation capability data of the second account from the log file; and a discarding module, configured to discard, in the operation capability data of the second account, operation capability data whose recording time is earlier than the discarding time.

In some embodiments, the information recommendation apparatus 455 further includes: a discarding time determining module, configured to subtract a duration threshold from a current time to obtain a discarding time; a recording time acquiring module, configured to acquire recording time of the operation capability data of the second account from the log file; and a data acquiring module, further configured to acquire, from the log file, operation capability data of the second account whose recording time is not earlier than the discarding time.

In some embodiments, the statistical module is further configured to acquire account data of the target account in the application and account data of the second account in the application; the account data including at least one of an account type and an account level; traversing each account in the second account, and when account data of a traversed account is the same as the account data of the target account, determining the traversed account as a comparison account; and performing statistical processing on operation capability data of the comparison account to obtain statistical data.

In some embodiments, the statistical module is further configured to: add an account having a buddy relationship with a to-be-processed account to a buddy network of the to-be-processed account, and add a new account having a buddy relationship with an account in the buddy network to the buddy network until a preset stop condition is met; the to-be-processed account including any one of the comparison account and the target account; and discarding the operation capability data of the comparison account when an account overlapping degree between a buddy network of the comparison account and a buddy network of the target account is less than an overlapping degree threshold.

In some embodiments, the information recommendation apparatus 455 further includes a content acquiring module, configured to acquire a plurality of pieces of to-be-displayed content corresponding to the operation capability data and a value trigger condition corresponding to each piece of to-be-displayed content; and a content determining module, configured to: determine, when the operation capability data of the target account meets any value trigger condition, to-be-displayed content corresponding to the met value trigger condition, so as to be displayed on the display interface; the to-be-displayed content including at least one of the guidance content and introduction content; and the introduction content representing an improvement process of improving the operation capability data of the target account.

In some embodiments, the information recommendation apparatus 455 further includes a record acquiring module, configured to acquire an improvement record of the operation capability data by using the second account from the log file; the improvement record including an invoked service and operation capability data before improvement; and the service being used for improving the operation capability data; a sample determining module, configured to: determine, when a service in the improvement record is the same as a service corresponding to the to-be-displayed content, the operation capability data before improvement in the improvement record as sample data; a quantity determining module, configured to: acquire a plurality of specified value intervals corresponding to the operation capability data, and determine a quantity of sample data corresponding to each specified value interval; and a condition determining module, configured to: determine, when the quantity of sample data corresponding to the specified value interval meets a quantity condition, the specified value interval as the value trigger condition corresponding to the to-be-displayed content.

In some embodiments, the content acquiring module is further configured to: transmit a query request that includes the account identifier of the target account to the blockchain network, so that in response to receiving the query request, a node in the blockchain network queries a plurality of pieces of to-be-displayed content corresponding to the account identifier and a value trigger condition corresponding to each piece of to-be-displayed content in a blockchain, and returns a query result. The to-be-displayed content is corresponding to the operation capability data.

In some embodiments, the display module 4551 is further configured to acquire a plurality of gap intervals and display effects respectively corresponding to the plurality of gap intervals; separately perform matching processing on the gap and the plurality of gap intervals; and display the gap according to a display effect corresponding to a successfully matched gap interval. The display effect includes at least one of a text effect and an icon effect.

An embodiment of this application provides a computer readable storage medium that stores an executable instruction. When the executable instruction is executed by a processor, the processor performs the information recommendation method provided in the embodiments of this application, for example, the information recommendation method shown in FIG. 6A, FIG. 6B, FIG. 7A, or FIG. 7B. A computer includes various electronic devices, including a terminal device and a server.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

As an example, the executable instruction may be deployed on one electronic device for execution, or executed on a plurality of electronic devices located at one location, or executed on a plurality of electronic devices distributed at a plurality of locations and interconnected by using a communication network.

Based on the above, the following technical effects at least can be achieved through the embodiments of this application:
(1) By displaying the gap between the target account and the second account in operation capability data in the application and the guidance content corresponding to the operation capability data of the target account, the reference value of the corresponding guidance content can be clearly defined through the gap, so that the user can determine whether to browse the guidance content, thus improving effectiveness and pertinence of information recommendation, and better assisting the user to operate the application.
(2) When there is operation capability data in a plurality of dimensions, information with a higher degree of importance is preferentially displayed according to a display sequence of gaps, thereby further improving effectiveness of information recommendation, and ensuring that a quantity of information on the display interface is not too large, thereby facilitating division of more dimensions and more fine-grained recommendation attribute data; The display sequence of the gaps may be obtained with reference to a historical improvement frequency, so that the display sequence of the gaps is closer to an operation capability data improvement habit of the target account, and further pertinence is improved.
(3) Account selection is performed by using the recording time and/or the account data of the second account, so as to compare the operation capability data horizontally, thereby improving the effectiveness of the obtained gap.
(4) A plurality of pieces of to-be-displayed content and corresponding value trigger conditions may be acquired from the blockchain. Because the blockchain has a non-tampering feature, accuracy of the acquired data can be improved.

The foregoing descriptions are merely embodiments of this application and are not intended to limit the protection scope of this application. Any modification, equivalent replacement, or improvement made without departing from the spirit and range of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs an information recommendation method. In practical application, the foregoing functions may be allocated to and completed by different functional modules according to requirements, that is, an inner structure of a device is divided into different functional modules to implement all or a part of the functions described above.

What is claimed is:

1. An information recommendation method, performed by an electronic device and comprising:
in response to receiving a recommendation instruction in an application for a target account:
displaying, on a display interface of the application, a gap in operation capability data of the application between the target account and a second account;
displaying guidance content corresponding to operation capability data of the target account, wherein the guidance content is used to improve the operation capability data of the target account; and
displaying introduction content corresponding to the operation capability data of the target account, wherein the introduction content represents an improvement process for enhancing the operation capability data of the target account.

2. The information recommendation method according to claim 1, wherein displaying the gap in operation capability data in the application between the target account and the second account, and displaying the guidance content corresponding to the operation capability data of the target account comprises:
sequentially displaying gaps the second in operation capability data between the target account and the second account for a plurality of dimensions in the application; and
displaying, in a display region associated with a respective dimension in the plurality of dimensions, guidance content corresponding to operation capability data of the target account in the respective dimension.

3. The information recommendation method according to claim 2, further comprising:
for the respective dimension in the plurality of dimensions:
acquiring, from a log file, an improvement frequency of improving the respective dimension of the operation capability data by the target account; and
performing fusion processing on the improvement frequency of the operation capability data in the respective dimension and a gap in the operation capability data for the respective dimension between the target account and the second account, to obtain a fusion result of the respective dimension; and
performing sorting processing on fusion results corresponding to the plurality of dimensions, to obtain a display sequence of the gaps for the plurality of dimensions.

4. The information recommendation method according to claim 3, further comprising:
acquiring the operation capability data of the second account from the log file;
performing statistical processing on the operation capability data of the second account to obtain statistical data; and
determining a gap between the operation capability data of the target account and the statistical data as the gap between the target account and the second account in operation capability data.

5. The information recommendation method according to claim 4, wherein after the acquiring the operation capability data of the second account from the log file, the method further comprises:
subtracting a duration threshold from a current time to obtain a discarding time;
acquiring a recording time of the operation capability data of the second account from the log file; and
discarding, from the operation capability data of the second account, operation capability data having a recording time is earlier than the discarding time.

6. The information recommendation method according to claim 4, wherein acquiring the operation capability data of the second account from the log file comprises:
subtracting a duration threshold from a current time to obtain a discarding time;
acquiring a recording time of the operation capability data of the second account from the log file; and
acquiring, from the log file, operation capability data of the second r account having a recording time is not earlier than the discarding time.

7. The information recommendation method according to claim 4, wherein performing statistical processing on the operation capability data of the second account to obtain statistical data comprises:
acquiring account data of the target account in the application and account data of the second account in the application; the account data comprising at least one of an account type and an account level;
traversing each account in the second account, and in accordance with a determination that account data of a traversed account matches the account data of the target account, setting the traversed account as a comparison account; and
performing statistical processing on operation capability data of the comparison account to obtain statistical data.

8. The information recommendation method according to claim 7, wherein after determining the traversed account as a comparison account, the method further comprises:
adding an account having a buddy relationship with a to-be-processed account to a buddy network of the to-be-processed account;
adding a new account having a buddy relationship with an account in the buddy network to the buddy network until a preset stop condition is met; the to-be-processed account comprising any one of the comparison account and the target account; and
discarding the operation capability data of the comparison account in accordance with a determination that an account overlapping degree between a buddy network of the comparison account and a buddy network of the target account is less than an overlapping degree threshold.

9. The information recommendation method according to claim 1, wherein guidance content comprises a service entry; and the information recommendation method further comprises:
in response to detecting a trigger operation on the service entry in the guidance content: displaying a plurality of candidate services, each of the plurality of services being used for improving the operation capability data of the target account; and
in response to detecting a trigger operation on any one of the displayed candidate services:
invoking a triggered service.

10. The information recommendation method according to claim 1, further comprising:
generating the recommendation instruction for the target account in response to one or more of:
receiving a trigger operation for a recommendation entry in the display interface;
receiving a keyword associated with the operation capability data;
matching, of a current time to a preset recommendation time;
detecting a start of the application; and
determining that the operation capability data of the target account is continuously less than an average level within a specified time period, wherein the average level comprising statistical data of operation capability data of the second account and statistical data of operation capability data of an account in a same period, and wherein the account in the same period representing an account having a different registration time from a registration time of the target account by less than a registration duration threshold.

11. The information recommendation method according to claim 1, further comprising:
- acquiring a plurality of pieces of to-be-displayed content associated with the operation capability data and a corresponding value trigger condition for each piece of the to-be-displayed content; and
- in accordance with a determination that the operation capability data of the target account meets any of the corresponding value trigger condition, displaying the to-be-displayed content corresponding to a met value trigger condition on the display interface, wherein the to-be-displayed content comprises at least one of the guidance content and introduction content, and wherein the introduction content represents an improvement process for the operation capability data of the target account.

12. The information recommendation method according to claim 11, further comprising:
- acquiring an improvement record of the operation capability data using the second account from the log file; the improvement record comprising an invoked service and operation capability data before improvement, wherein the service is used for improving the operation capability data;
- in accordance with a determination that a service in the improvement record matches a service corresponding to the to-be-displayed content, setting the operation capability data before improvement in the improvement record as sample data;
- acquiring a plurality of specified value intervals corresponding to the operation capability data, and determining a quantity of sample data corresponding to each specified value interval; and
- in accordance with a determination that the quantity of sample data corresponding to the specified value interval meets a quantity condition: setting the specified value interval as the value trigger condition corresponding to the to-be-displayed content.

13. The information recommendation method according to claim 11, wherein acquiring the plurality of pieces of to-be-displayed content corresponding to the operation capability data and the value trigger condition corresponding to each piece of to-be-displayed content comprises:
- transmitting a query request comprising an account identifier of the target account to a blockchain network; and
- receiving a query result from a node in the blockchain network, wherein the node queries a plurality of pieces of to-be-displayed content corresponding to the account identifier and a value trigger condition corresponding to each piece of to-be-displayed content in a blockchain, and wherein the to-be-displayed content corresponds to the operation capability data.

14. An electronic device, comprising:
one or more processors; and
memory storing one or more programs, the one or more programs comprising instructions that, when executed by the one or more processors, cause the one or more processors to perform operations comprising:
in response to receiving a recommendation instruction in an application for a target account:
- displaying, on a display interface of the application, a gap in operation capability data of the application between the target account and a second account;
- displaying guidance content corresponding to operation capability data of the target account, wherein the guidance content is used to improve the operation capability data of the target account; and
- displaying introduction content corresponding to the operation capability data of the target account, wherein the introduction content represents an improvement process for enhancing the operation capability data of the target account.

15. The electronic device according to claim 14, wherein:
generating the recommendation instruction for the target account in response to one or more of:
- receiving a trigger operation for a recommendation entry in the display interface;
- receiving a keyword associated with the operation capability data;
- matching, of a current time to a preset recommendation time;
- detecting a start of the application; and
- determining that the operation capability data of the target account is continuously less than an average level within a specified time period, wherein the average level comprising statistical data of operation capability data of the second account and statistical data of operation capability data of an account in a same period; and wherein the account in the same period representing an account having a different registration time from a registration time of the target account by less than a registration duration threshold.

16. The electronic device according to claim 14, wherein the electronic device is further configured to:
- acquire a plurality of pieces of to-be-displayed content associated with the operation capability data and a corresponding value trigger condition for each piece of the to-be-displayed content; and
- in accordance with a determination that the operation capability data of the target account meets any of the corresponding value trigger condition:
  - display the to-be-displayed content corresponding to a met value trigger condition on the display interface, wherein the to-be-displayed content comprises at least one of the guidance content and introduction content, and wherein the introduction content represents an improvement process for the operation capability data of the target account.

17. The electronic device according to claim 16, wherein acquiring the plurality of pieces of to-be-displayed content corresponding to the operation capability data and the value trigger condition corresponding to each piece of to-be-displayed content comprises:
- transmitting a query request comprising an account identifier of the target account to a blockchain network; and
- receiving a query result from a node in the blockchain network, wherein the node queries a plurality of pieces of to-be-displayed content corresponding to the account identifier and a value trigger condition corresponding to each piece of to-be-displayed content in a blockchain, and wherein the to-be-displayed content corresponds to the operation capability data.

18. A non-transitory computer-readable storage medium, storing a computer program, the computer program, when executed by one or more processors of an electronic device, cause the one or more processors to perform operations comprising:
in response to receiving a recommendation instruction in an application for a target account:
- displaying, on a display interface of the application, a gap in operation capability data of the application between the target account and a second account;
- displaying guidance content corresponding to operation capability data of the target account, wherein the guidance content is used to improve the operation capability data of the target account; and displaying introduction content corresponding to the operation capability data of the target account, wherein the introduction content represents an improvement process for enhancing the operation capability data of the target account.

19. The non-transitory computer-readable storage medium according to claim 18, wherein:

generating the recommendation instruction for the target account in response to one or more of:

receiving a trigger operation for a recommendation entry in the display interface;

receiving a keyword associated with the operation capability data;

matching, of a current time to a preset recommendation time;

detecting a start of the application; and determining that the operation capability data of the target account is continuously less than an average level within a specified time period, wherein the average level comprising statistical data of operation capability data of the second account and statistical data of operation capability data of an account in a same period; and wherein the account in the same period representing an account having a different registration time from a registration time of the target account by less than a registration duration threshold.

* * * * *